US008923910B2

(12) United States Patent
Wu et al.

(10) Patent No.: US 8,923,910 B2
(45) Date of Patent: Dec. 30, 2014

(54) METHODS AND APPARATUS FOR COMMUNICATING INFORMATION USING VARIOUS TRANSMISSION POWER LEVELS

(75) Inventors: Xinzhou Wu, Monmouth Junction, NJ (US); Junyi Li, Chester, NJ (US); Nilesh Khude, Bridgewater, NJ (US); Sundar Subramanian, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 594 days.

(21) Appl. No.: 12/712,629

(22) Filed: Feb. 25, 2010

(65) Prior Publication Data
US 2011/0205887 A1 Aug. 25, 2011

(51) Int. Cl.
| H04B 7/00 | (2006.01) |
| H04W 52/34 | (2009.01) |
| H04W 52/32 | (2009.01) |
| H04W 52/46 | (2009.01) |

(52) U.S. Cl.
CPC .......... *H04W 52/343* (2013.01); *H04W 52/322* (2013.01); *H04W 52/46* (2013.01)
USPC ....................................................... 455/522

(58) Field of Classification Search
USPC ......... 370/229–235, 236, 237, 318, 323, 332, 370/389, 391, 445, 447; 455/69, 522
See application file for complete search history.

(56) References Cited

U.S. PATENT DOCUMENTS

| 6,094,563 | A * | 7/2000 | Kakizawa ..................... 455/69 |
| 7,797,012 | B1 * | 9/2010 | Longoni et al. ............... 455/522 |
| 7,974,253 | B2 | 7/2011 | Laroia et al. |
| 2003/0210658 | A1 * | 11/2003 | Hernandez et al. ........... 370/311 |
| 2008/0075029 | A1 * | 3/2008 | Song .............................. 370/311 |
| 2009/0196210 | A1 * | 8/2009 | Desai ............................. 370/311 |
| 2009/0319504 | A1 * | 12/2009 | Alberth et al. ..................... 707/5 |
| 2010/0022266 | A1 * | 1/2010 | Villier et al. ................... 455/522 |
| 2011/0021235 | A1 * | 1/2011 | Laroia et al. .................. 455/522 |
| 2011/0085455 | A1 * | 4/2011 | Wu et al. ....................... 370/252 |
| 2011/0087768 | A1 * | 4/2011 | Wu et al. ....................... 709/224 |
| 2011/0205887 | A1 * | 8/2011 | Wu et al. ....................... 370/229 |

FOREIGN PATENT DOCUMENTS

| CN | 101299744 A | 11/2008 |
| JP | 2008085840 A | 4/2008 |
| KR | 100729418 B1 | 6/2007 |
| KR | 100729478 B1 | 6/2007 |

(Continued)

OTHER PUBLICATIONS

International Search Report and Written Opinion—PCT/US2011/026318—ISA/EPO—Jun. 15, 2011.

*Primary Examiner* — Phuongchau Ba Nguyen
(74) *Attorney, Agent, or Firm* — James K. O'Hare

(57) ABSTRACT

A wireless communications device supports a constant transmission power mode of operation and a time varying transmission power mode of operation for transmitting data, e.g., peer discovery data. The device determines an amount of network congestion and switches between the two modes of operation as a function of the determined amount of network congestion. Various described methods and apparatus are well suited for use in a peer to peer ad hoc wireless communications system in which a limited amount of air link resources are available for peer discovery signaling and the same peer discovery resources are, at times, used concurrently by multiple devices. When network congestion is low, the device operates in the constant transmission power mode. When network congestion is high, the device operates in the time varying power mode. Devices sharing a common peer discovery resource in a local area intentionally select different time varying transmission patterns.

24 Claims, 18 Drawing Sheets

(56) References Cited

FOREIGN PATENT DOCUMENTS

| WO | WO-2006096887 | | 9/2006 |
|----|---------------|----|--------|
| WO | WO2007085701 | A1 | 8/2007 |
| WO | WO2009039439 | | 3/2009 |
| WO | WO2009146613 | A1 | 12/2009 |

* cited by examiner

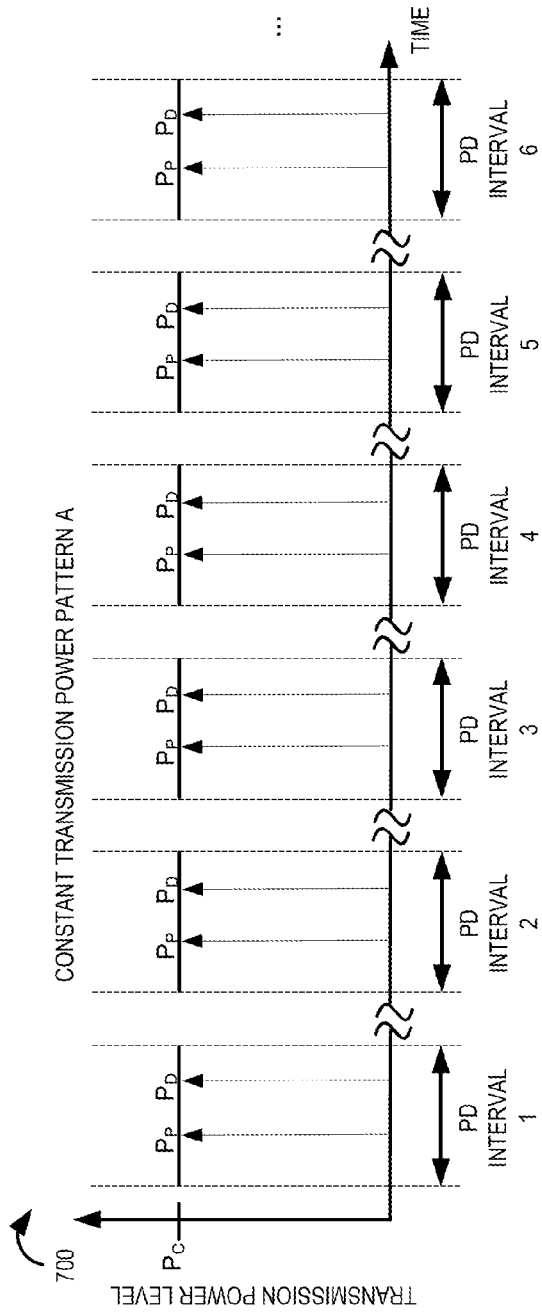
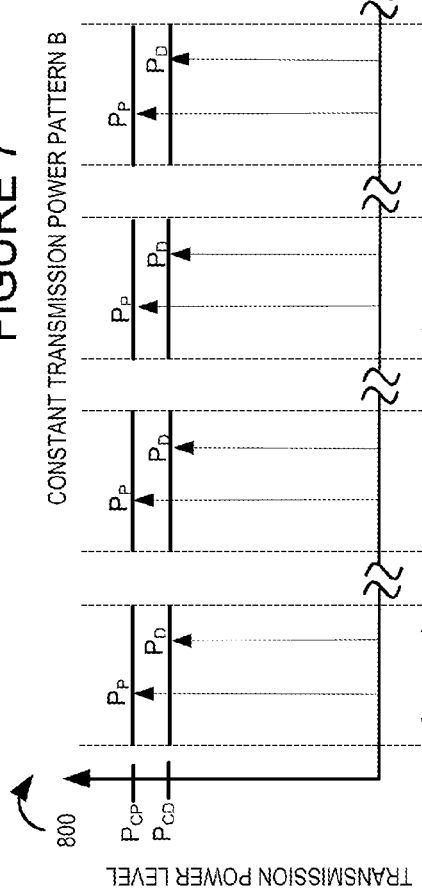
FIGURE 7
FIGURE 8

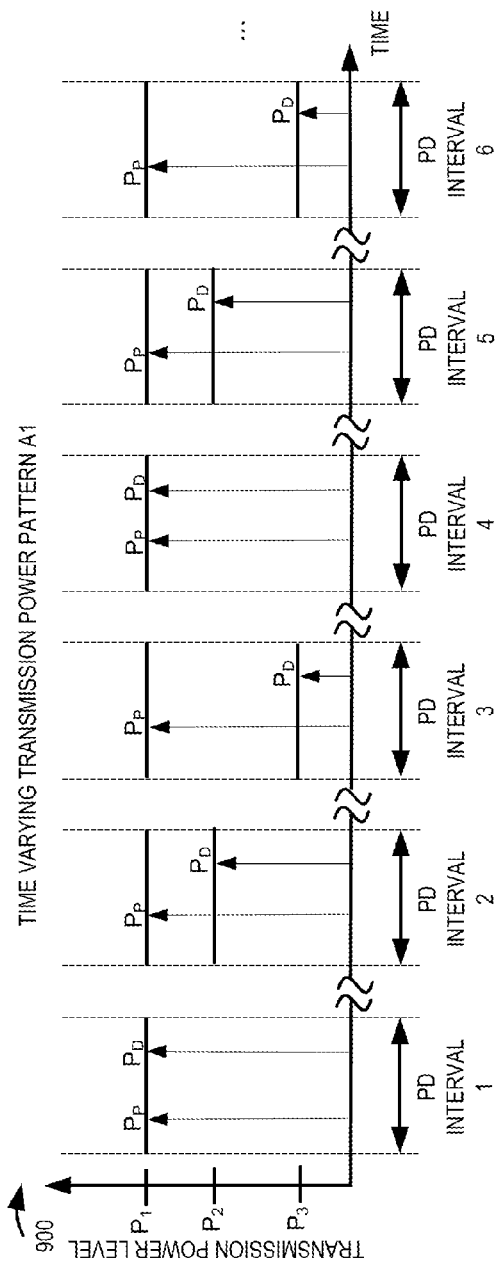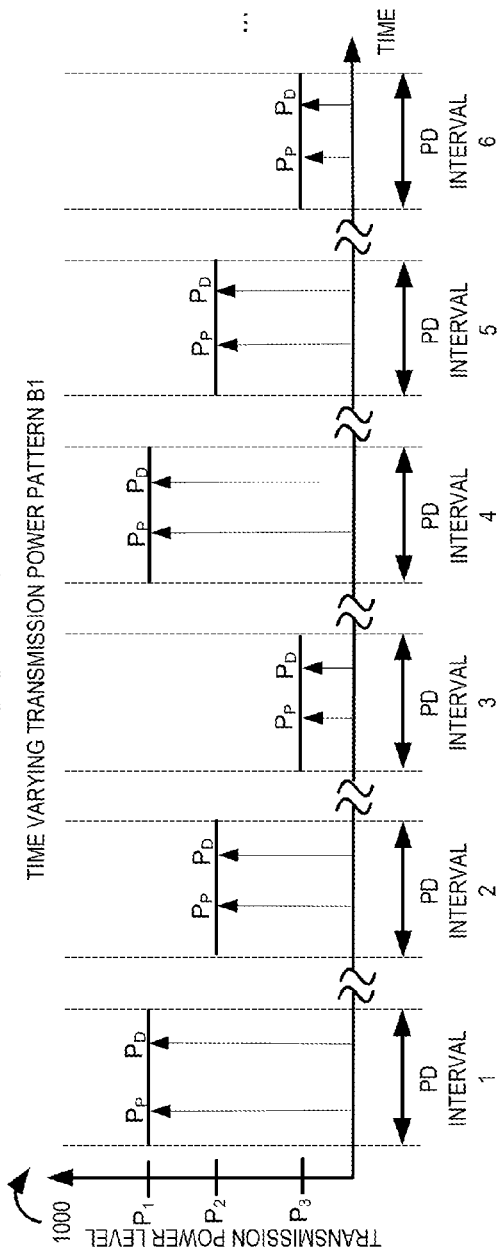

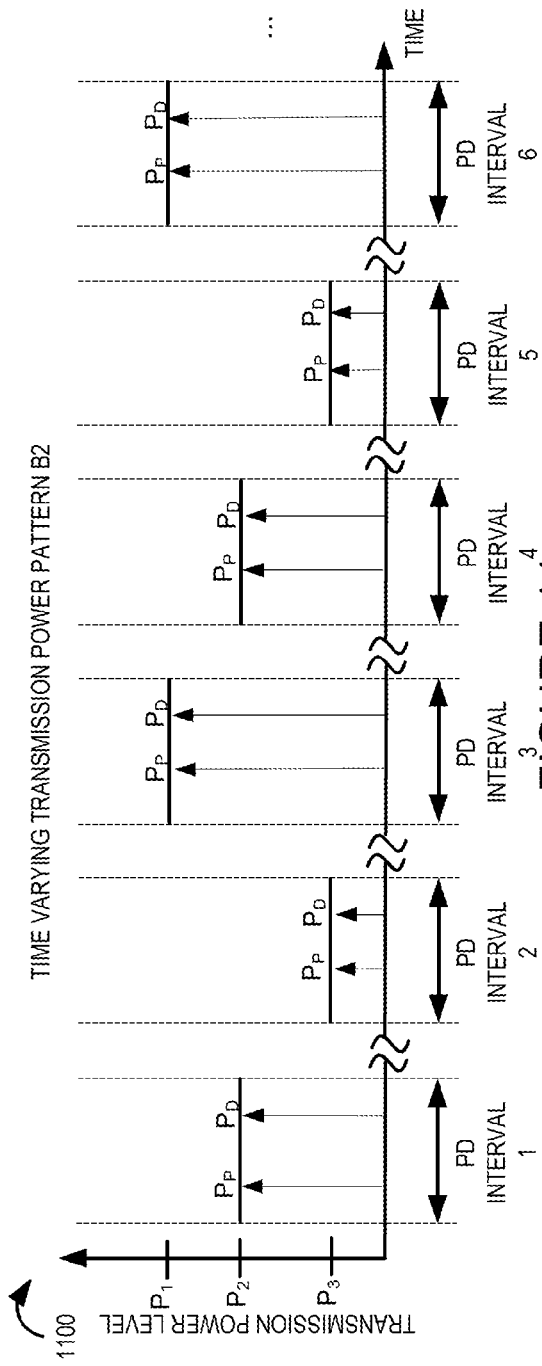
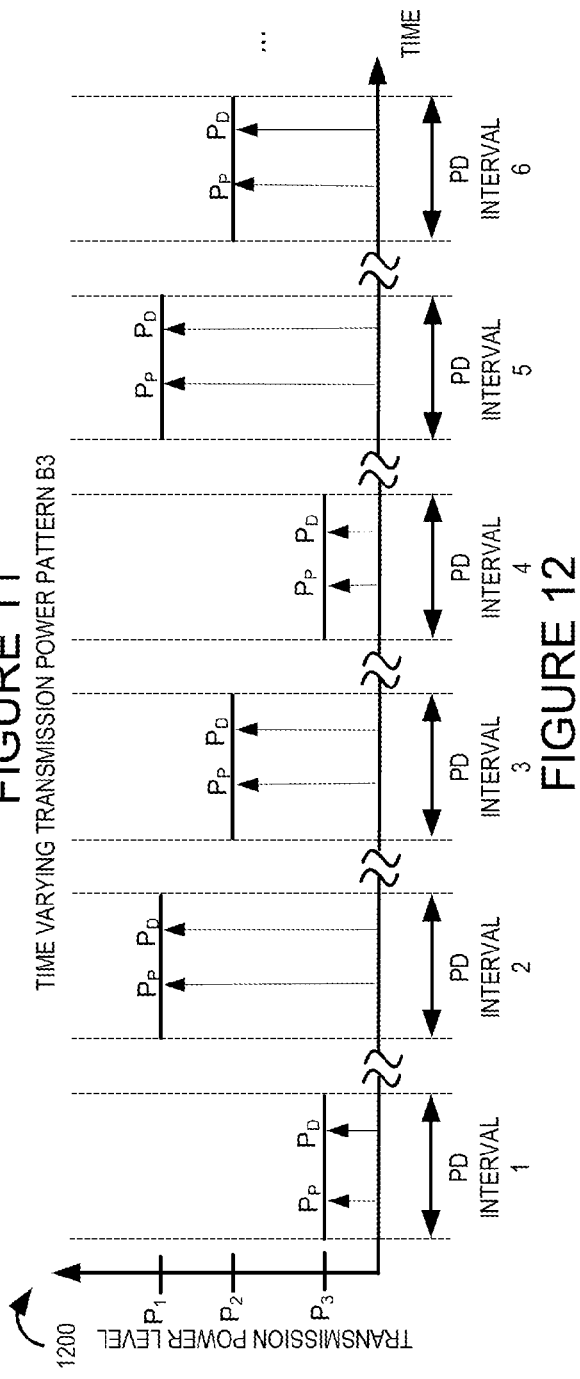

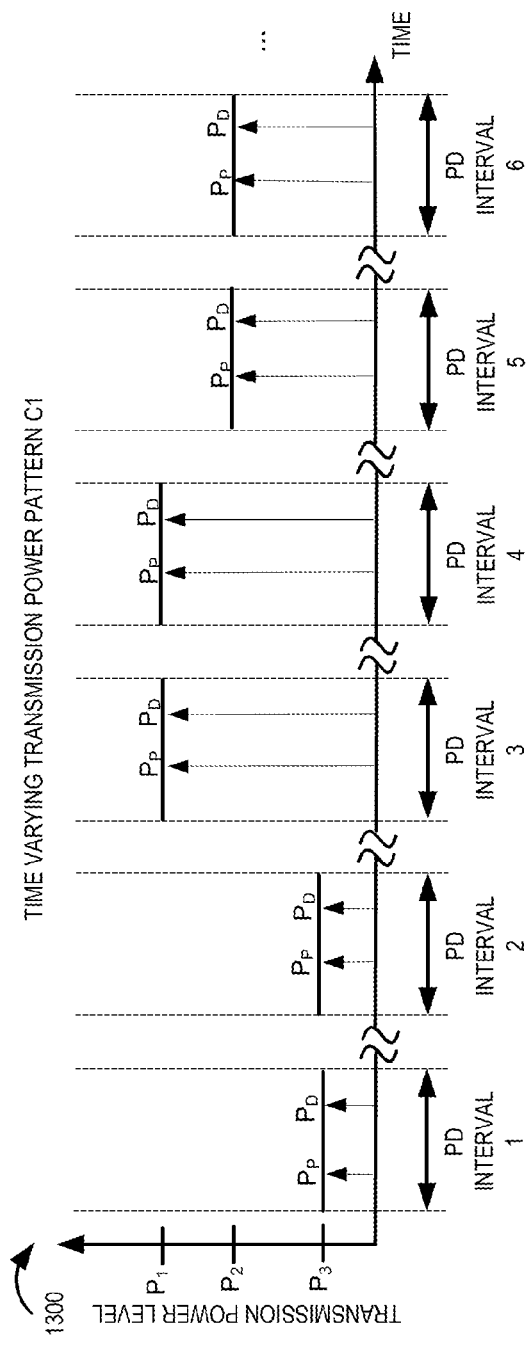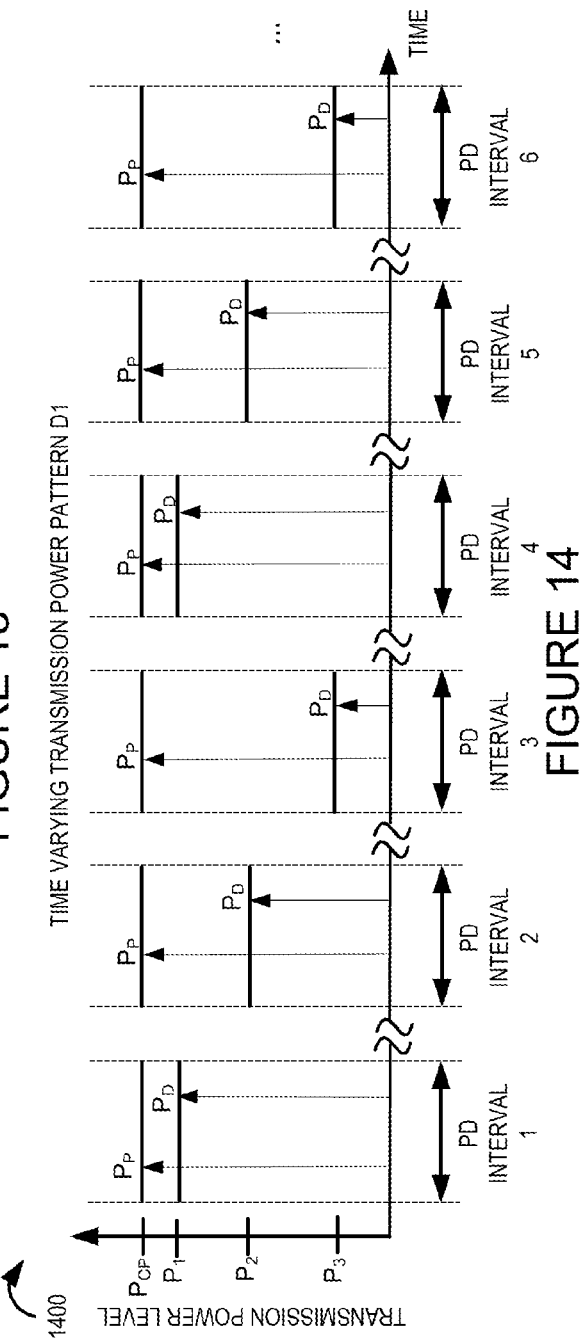

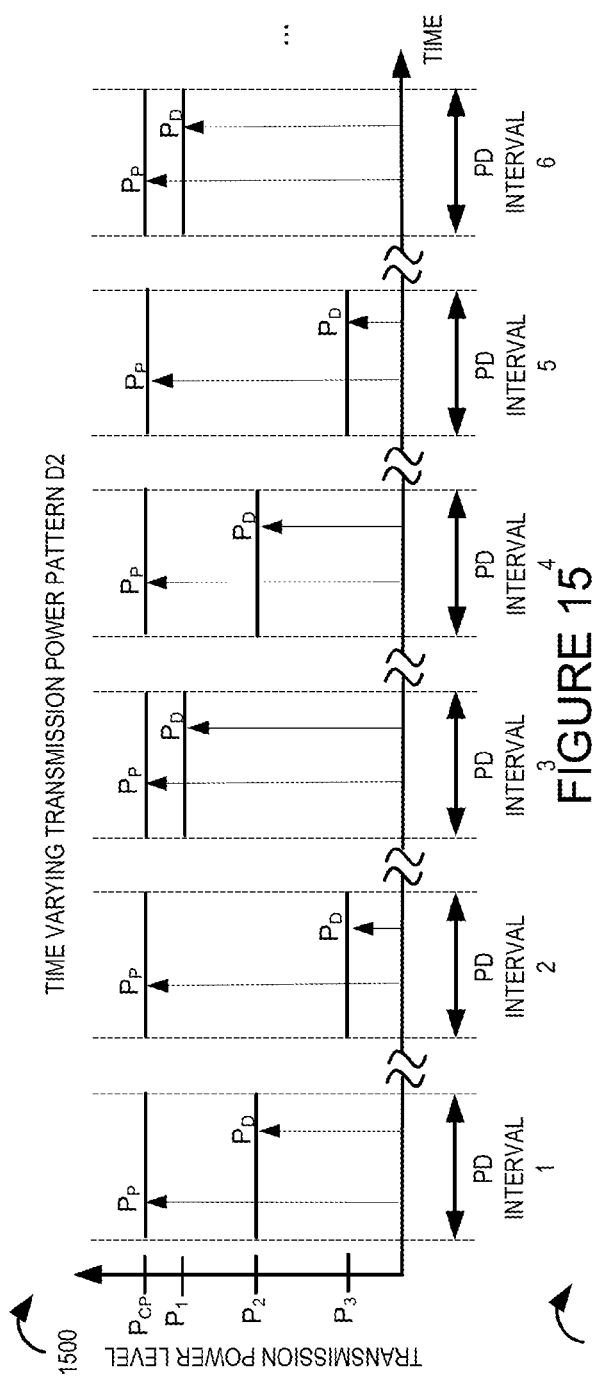
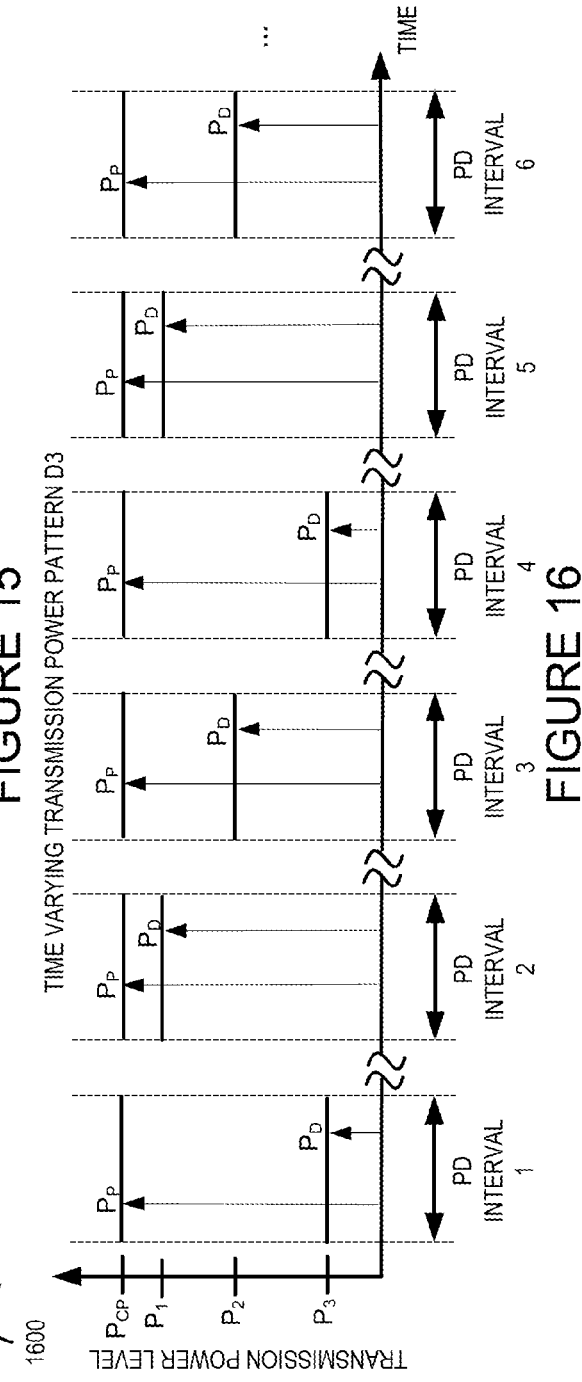
FIGURE 15
FIGURE 16

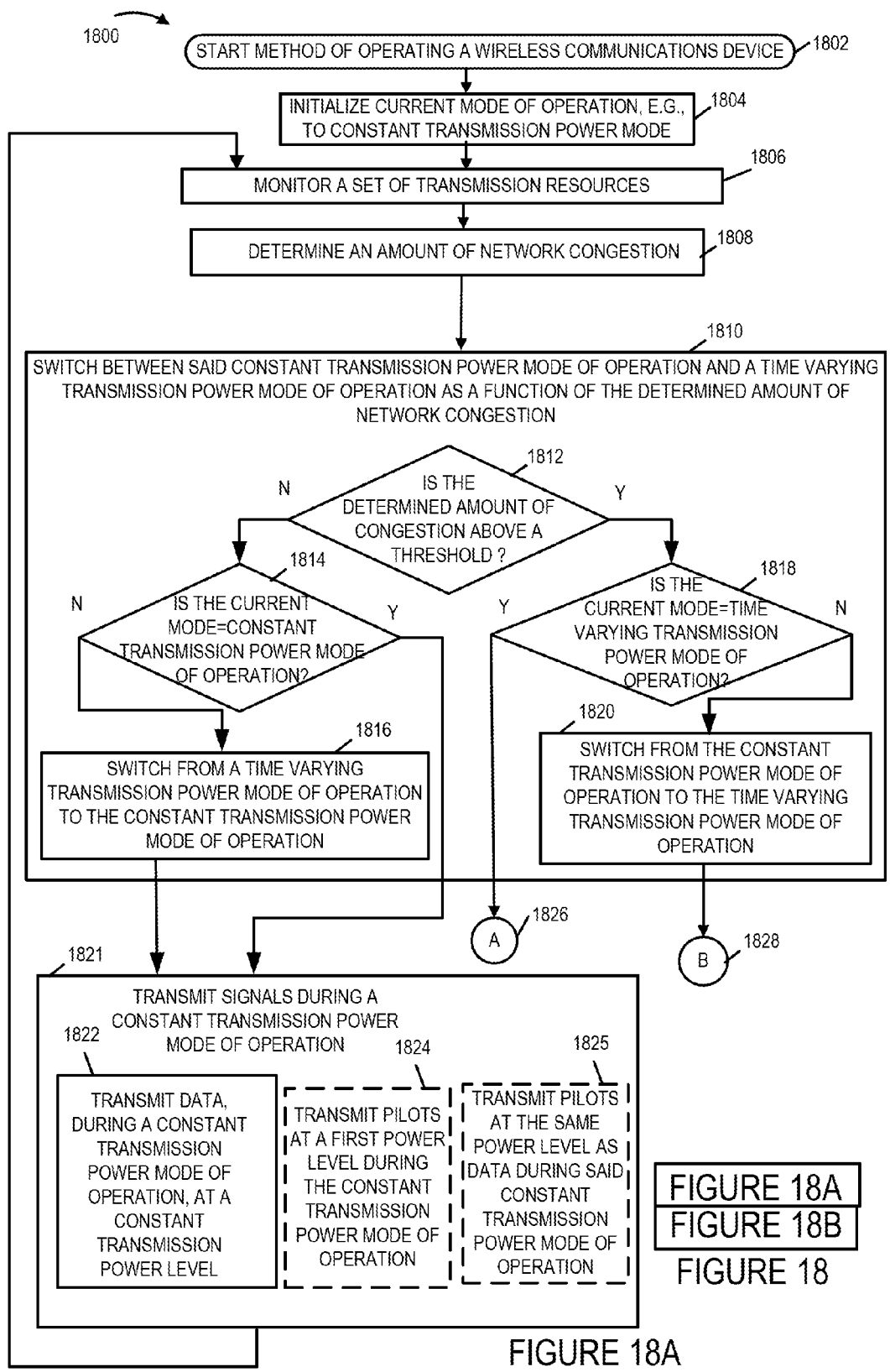

METHODS AND APPARATUS FOR COMMUNICATING INFORMATION USING VARIOUS TRANSMISSION POWER LEVELS

FIELD

Various embodiments relate to wireless communications methods and apparatus and, more particularly, to wireless communications methods and apparatus for transmitting data and/or information using multiple different transmission power levels.

BACKGROUND

In some peer to peer communications systems there are a limited amount of air link resources available for peer discovery broadcast signaling. Congestion in the system may, and often does, vary widely over time. Sometimes there may be only a few devices which desire to broadcast peer discovery signals, and each device may be able to acquire and use a peer discovery resource which is not being used by any other device in its vicinity. However, at other times there may be a very large number of devices which desire to broadcast peer discovery signals, and there may not be enough peer discovery resources available for each device to select a unique resource. As a result, at times of high congestion it is expected that multiple users may acquire and transmit on the same peer discovery resources. This concurrent use of a common resource creates interference problems for devices attempting to recover the broadcast peer discovery signals.

Based on the above discussion it should be appreciated that there is a need for methods and apparatus for communicating data which are responsive to the network congestion environment. Methods and apparatus which tend to mitigate interference problems when network congestion is high would be especially beneficial.

SUMMARY

Methods and apparatus for wireless communications in a communications system in which air link resources may be, and sometimes are, used concurrently by multiple devices are described. Various described methods and apparatus are well suited for use in a wireless peer to peer network, e.g., an ad hoc peer to peer network.

In some embodiments a wireless communications device determines an amount of network congestion from its perspective, and uses its determination to set its mode of operation. At the same time different wireless communications devices in the network may have a different view of network congestion.

If a wireless communications device determines that from its perspective network congestion is low, the device operates in a constant transmission power mode of operation, transmitting data, e.g., peer discovery data, at a constant power level. If the wireless communications device determines, from its perspective, that network congestion is high, the wireless communications device operates in a time varying transmission power mode of operation, transmitting data, e.g., peer discovery data, using a power level that varies as a function of time.

In some embodiments, a communications device operating in the time varying transmission power mode of operation randomly selects one of a plurality of different transmission power level patterns to control the transmission power level as a function of time. In some embodiments the communications device operating in the time varying transmission power mode of operation selects one of a plurality of different transmission power level patterns to control the transmission power level as a function of time based on which of a plurality of pilot sequences are used by devices in the vicinity of said wireless communications device. In some embodiments, different transmission power level patterns are associated with different pilot sequences.

In a high network congestion environment, it is expected that multiple devices in a local vicinity will concurrently transmit data on a common set of resources, e.g., multiple devices in a local vicinity will broadcast peer discovery data on a common set of peer discovery resources, and thus cause interference to one another. When different transmitting devices transmitting on a common resource operate in time varying modes of operation in accordance with various embodiments, but are offset in time with respect to the time of maximum power transmission, the likelihood of successful recovery of the transmitted data increases.

An exemplary method of operating a communications device to communicate information, in accordance with one exemplary embodiment comprises: transmitting data, during a constant transmission power mode of operation, at a constant transmission power level; and transmitting data, during a time varying transmission power mode of operation, using a power level that varies as a function of time.

One exemplary communications device comprises: at least one processor configured to: transmit data, during a constant transmission power mode of operation, at a constant transmission power level; and transmit data, during a time varying transmission power mode of operation, using a power level that varies as a function of time. The communications device may, and in some embodiments does, include a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7 is a drawing illustrating an exemplary constant transmission power pattern used in some embodiments.

FIG. 8 is a drawing illustrating another exemplary constant transmission power pattern used in some embodiments.

FIG. 9 is a drawing illustrating an exemplary time varying transmission power pattern used in some embodiments.

FIG. 10 is a drawing illustrating an exemplary time varying transmission power pattern used in some embodiments.

FIG. 11 is a drawing illustrating an exemplary time varying transmission power pattern used in some embodiments.

FIG. 12 is a drawing illustrating an exemplary time varying transmission power pattern used in some embodiments.

FIG. 13 is a drawing illustrating an exemplary time varying transmission power pattern used in some embodiments.

FIG. 14 is a drawing illustrating an exemplary time varying transmission power pattern used in some embodiments.

FIG. 15 is a drawing illustrating an exemplary time varying transmission power pattern used in some embodiments.

FIG. 16 is a drawing illustrating an exemplary time varying transmission power pattern used in some embodiments.

FIG. 18A is a first part of a flowchart of an exemplary method of operating a wireless communications device, in accordance with an exemplary embodiment.

DETAILED DESCRIPTION

Figure 1:
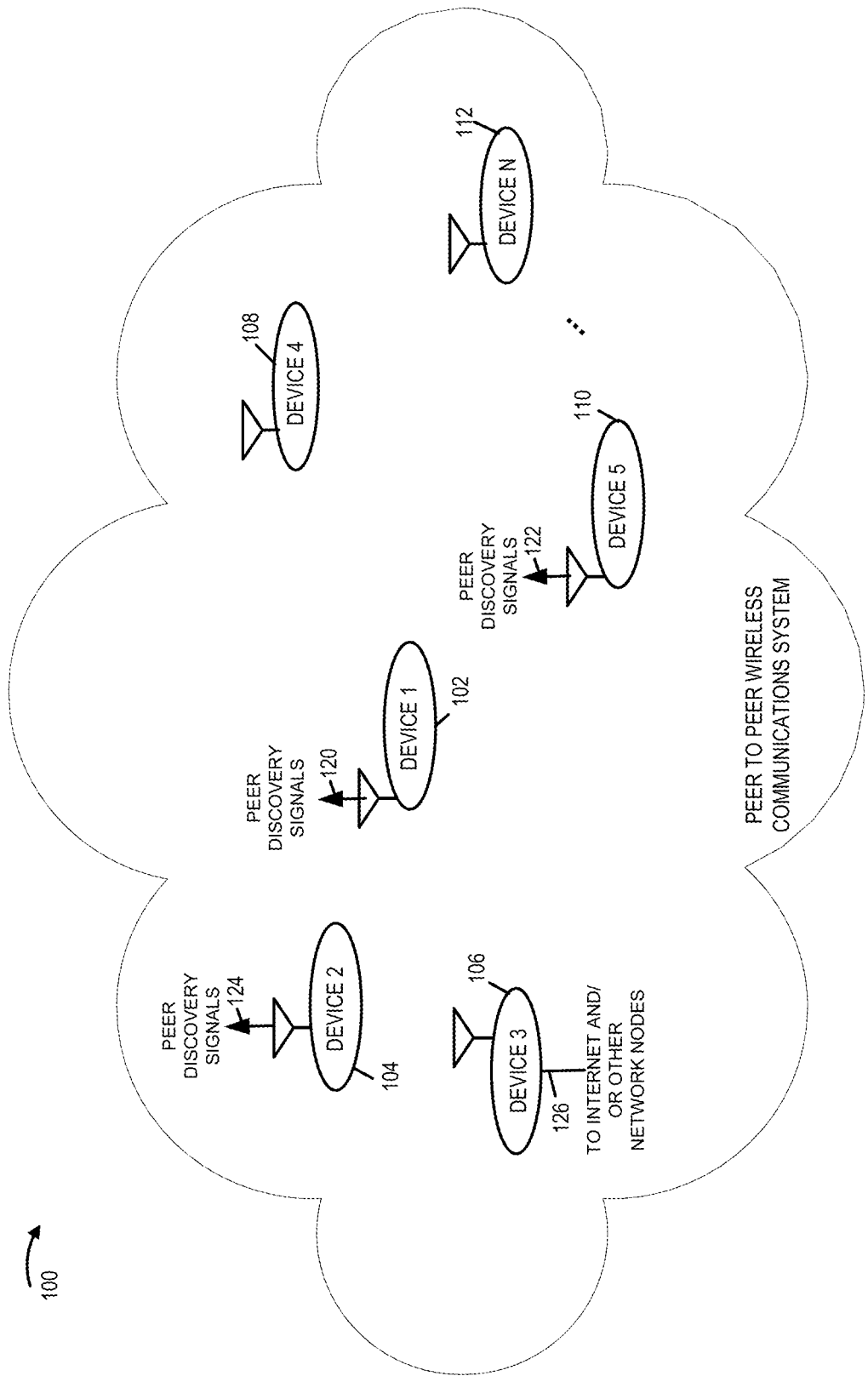
FIG. 1 illustrates an exemplary peer to peer wireless communications system, in accordance with an exemplary embodiment.

FIG. 1 illustrates an exemplary peer to peer wireless communications system 100 implemented in accordance with various exemplary embodiments. Exemplary communications system 100 includes a plurality of wireless communications devices including communications device 1 102, communications device 2 104, communications device 3 106, communications device 4 108, communications device 5 110, . . . , and communications device n 112. The wireless communications devices (102, 104, 106, 108, 110, . . . , 112) support peer to peer communications. The wireless communications devices (102, 104, 106, 108, 110, . . . , 112) support various types of signaling between peers, e.g., peer discovery signals, paging signals, traffic data transmissions, etc. Some of the wireless communications devices, e.g., device 102, 104, 108, 110, and 112 are mobile communications devices, e.g., mobile wireless terminals such as handheld mobile communications devices. Some other devices, e.g., device 3 106, may be fixed location devices such as, e.g., an access router device including a wireless interface supporting a peer to peer signaling protocol and a wired interface providing coupling to a backhaul network. Exemplary communications device 3 106 provides access to the Internet and/or other network nodes via a wired or fiber network connection 126.

Exemplary communications system 100 uses a recurring peer to peer timing structure including sets of communications resources, e.g., sets of peer discovery resources, sets of paging/connection establishment resources and/or sets of peer to peer traffic signaling resources. One or more communications devices in system 100 may transmit, e.g., broadcast, peer discovery signals including peer discovery data using peer discovery air link resources. Exemplary peer discovery data includes, e.g., a device identifier, device information, a user identifier, user information, a group identifier, a request for a device or user, a request for a service, a request for a product, a request for information, an offer of service, an offer of a product, location information, etc. Devices may also transmit other types of signals, e.g., peer to peer traffic signals including peer to peer traffic data such as user data including, e.g., voice, text, and/or image data, using traffic transmission air link resources, to one or more of other communications devices in the communications system 100. Another exemplary type of signal which may be transmitted is a paging signal, e.g., a device notification signal. The paging signal may be a peer to peer paging signal conveyed using, e.g., paging/connection establishment air link resources.

For the purpose of illustration in FIG. 1, communications device 1 102 is shown transmitting peer discovery signals 120, e.g., including peer discovery data, which may be detected by other devices in its vicinity. Similarly, communications device 2 104 is shown transmitting peer discovery signals 124, e.g., including peer discovery data, which may be detected by other devices in its vicinity. In addition, communications device 5 110 is shown transmitting peer discovery signals 122, e.g., including peer discovery data, which may be detected by other devices in its vicinity.

It should be appreciated that the number of communications devices in the system 100 trying to communicate with one another using the peer to peer protocol, in some embodiments, changes dynamically, e.g., as one or more communications devices enter or leave the area covered by the network and/or as various devices in a local area decide to power on or decide to shut down. Thus at some points in time, network congestion may be low while at other times network congestion may be high. In various embodiments, when network congestion is high multiple devices may be, and sometimes are, transmitting peer discovery signals on the same set of peer discovery air link resources. In some such embodiments, different wireless devices transmitting on a common set of peer discovery air link resources use different pilot sequences. In some embodiments, different wireless communications devices transmitting peer discovery signals concurrently on the same set of peer discovery air link resources, may, and sometimes do, transmit peer discovery data at different transmission power levels.

In some embodiments, a wireless device determines an amount of network congestion, and switches between different modes of operation as a function of its determined amount of network congestion. In some embodiments, the different modes of operation include a constant transmission power mode of operation in which the wireless communications device transmits data, e.g., peer discovery data, at a constant transmission power level, and a time varying transmission power mode of operation, in which the wireless communications device transmits data, e.g., peer discovery data, using a power level that varies as a function of time. In some embodiments, the constant transmission power mode of operation corresponds to a determined low level of congestion, and the time varying transmission power mode of operation corresponds to a determined high level of congestion. In some embodiments, two peer to peer devices transmitting on the same set of peer discovery air link resources may, and sometimes do, transmit peer discovery data concurrently but at different transmission power levels.

Figure 2:
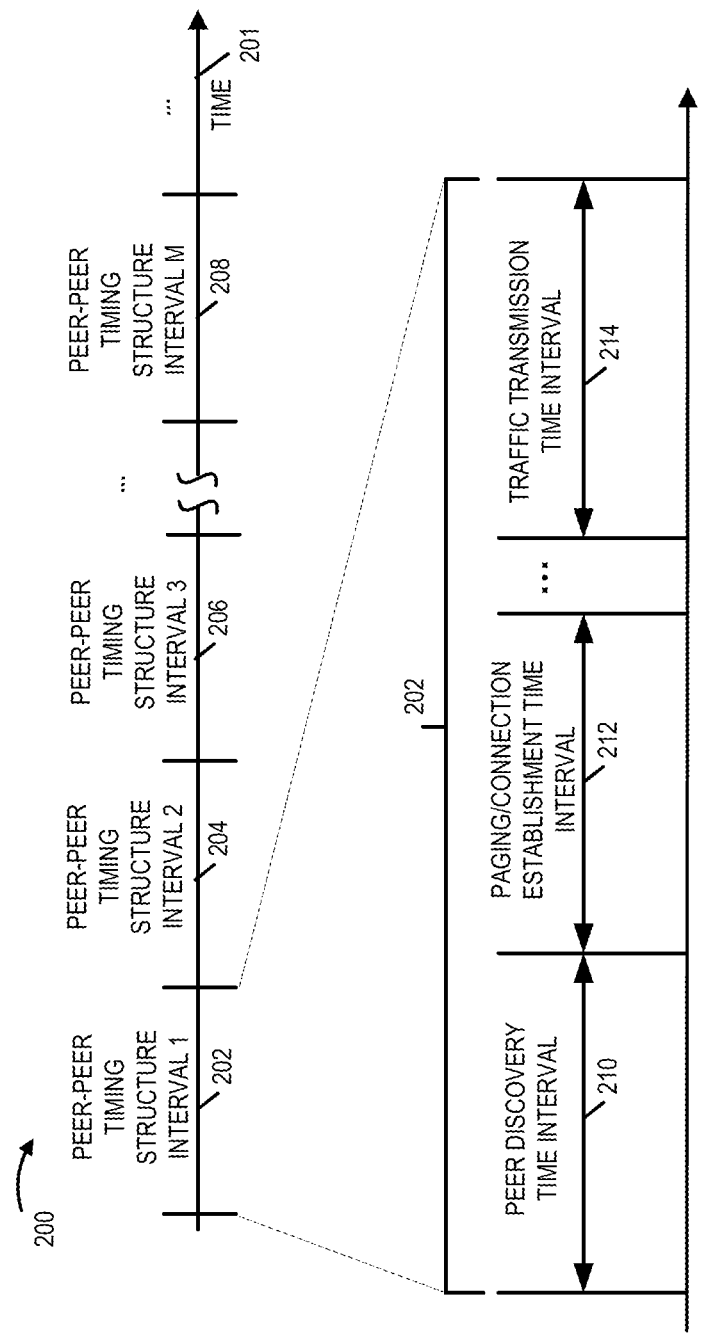
FIG. 2 illustrates exemplary time intervals which recur in an exemplary peer to peer transmission timing structure, in accordance with various embodiments.

FIG. 2 illustrates an exemplary recurring peer to peer timing structure 200 including a plurality of peer to peer timing structure intervals (peer to peer timing structure interval 1 202, peer to peer timing structure interval 2 204, peer to peer timing structure interval 3 206, ..., peer to peer timing structure interval M 208). Horizontal axis 201 represents time. Each of the peer to peer timing structure intervals (202, 204, 206, ..., 208) in the recurring timing structure 200 includes a plurality of sub-intervals, e.g., the same plurality of sub-intervals. Exemplary peer to peer timing structure interval 1 202 includes a peer discovery time interval 210, a paging/connection establishment time interval 212 and a traffic transmission time interval 214.

Figure 3:
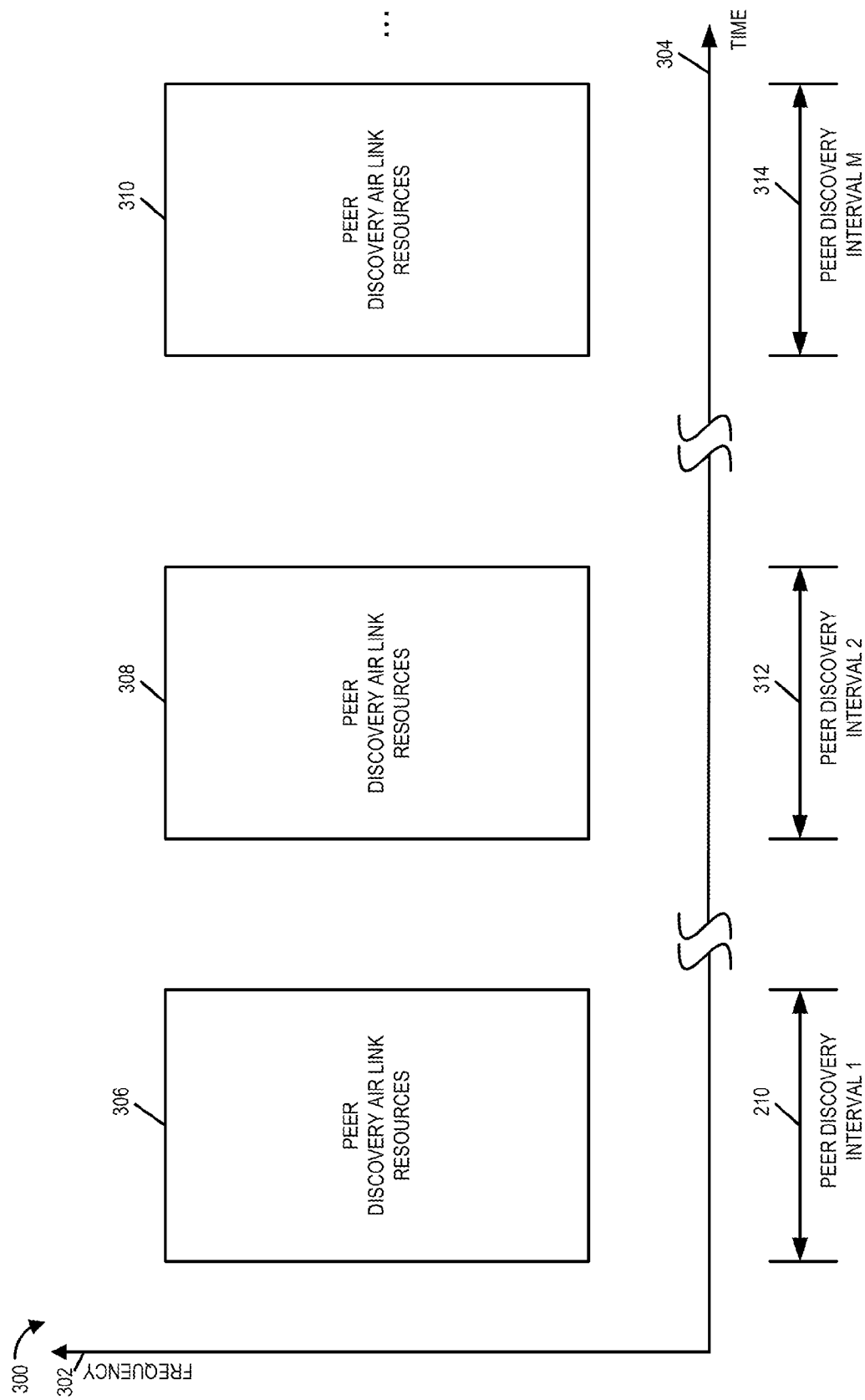
FIG. 3 is a drawing of an exemplary frequency vs time plot illustrating exemplary peer discovery air link resources in an exemplary peer to peer recurring timing structure.

FIG. 3 is a drawing of an exemplary frequency vs time plot 300 illustrating exemplary peer discovery air link resources in an exemplary peer to peer recurring timing structure. Frequency vs time plot 300 includes a vertical axis 302 representing frequency, e.g., OFDM tones, and a horizontal axis 304 representing time, e.g., OFDM symbol transmission time intervals. In this example, there are M peer discovery intervals (discovery interval 1 210, discovery interval 2 312, ..., discovery interval M 314) in the recurring timing structure. Peer discovery air link resources 306 occurs during peer discovery interval 1 210; peer discovery air link resources 308 occur during peer discovery interval 2 312; and peer discovery air link resources 310 occur during discovery interval M 314.

Figure 4:
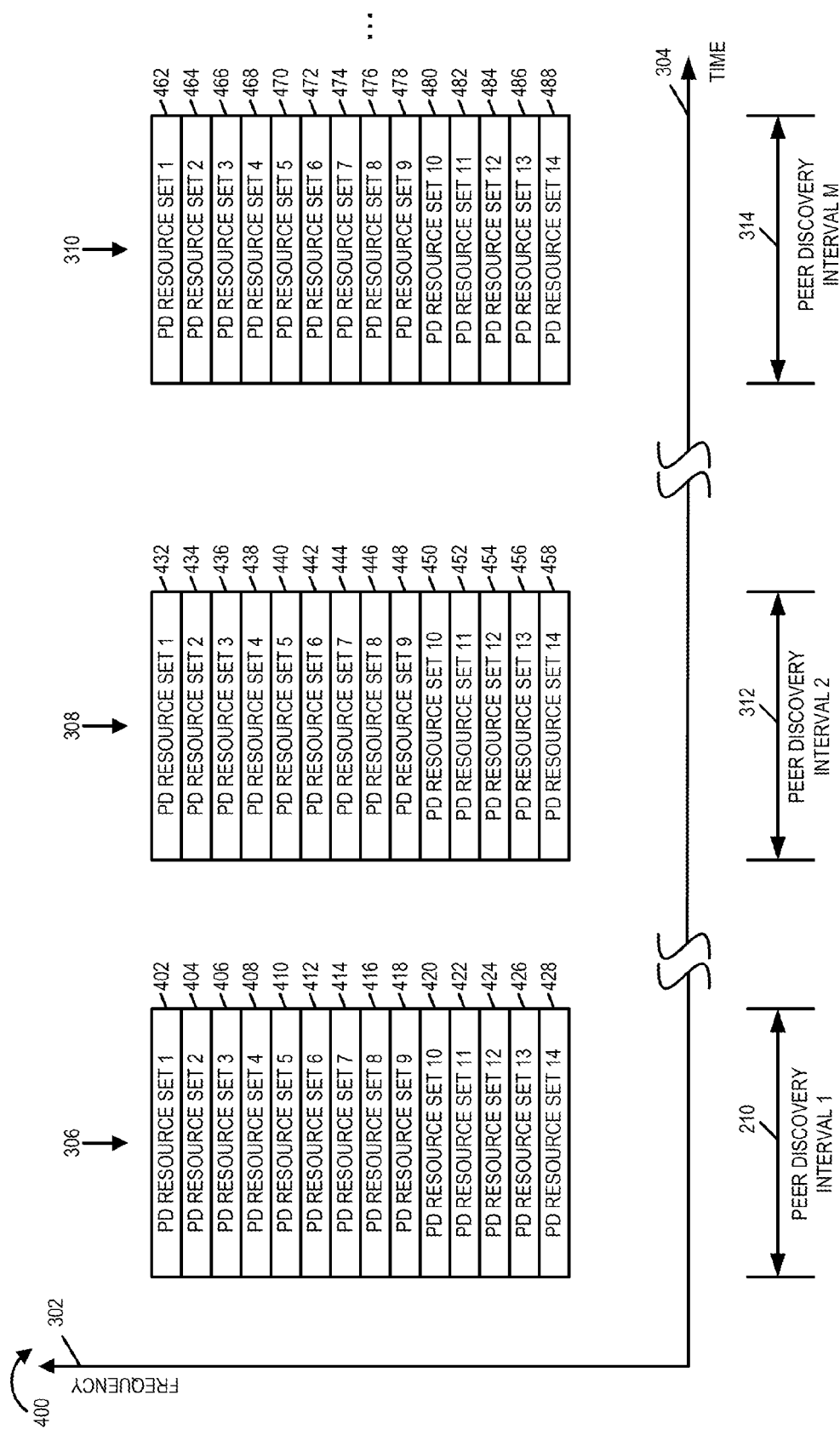
FIG. 4 is a drawing of an exemplary frequency vs time plot illustrating exemplary peer discovery resource sets within the peer discovery resource blocks illustrated in FIG. 3.

FIG. 4 is a drawing of an exemplary frequency vs time plot 400 illustrating exemplary peer discovery resource sets within the peer discovery resource blocks illustrated in FIG. 3. Peer discovery air link resources block 306 includes, in order from highest to lowest frequency, peer discovery resource set 1 402, peer discovery resource set 2 404, peer discovery resource set 3 406, peer discovery resource set 4 408, peer discovery resource set 5 410, peer discovery resource set 6 412, peer discovery resource set 7 414, peer discovery resources set 8 416, peer discovery resource set 9 418, peer discovery resource set 10 420, peer discovery resource set 11 422, peer discovery resource set 12 424, peer discovery resource set 13 426, and peer discovery resource set 14 428. Peer discovery air link resources block 308 includes, in order from highest to lowest frequency, peer discovery resource set 1 432, peer discovery resource set 2 434, peer discovery resource set 3 436, peer discovery resource set 4 438, peer discovery resource set 5 440, peer discovery resource set 6 442, peer discovery resource set 7 444, peer discovery resources set 8 446, peer discovery resource set 9 448, peer discovery resource set 10 450, peer discovery resource set 11 452, peer discovery resource set 12 454, peer discovery resource set 13 456, and peer discovery resource set 14 458. Peer discovery air link resources block 310 includes, in order from highest to lowest frequency, peer discovery resource set 1 462, peer discovery resource set 2 464, peer discovery resource set 3 466, peer discovery resource set 4 468, peer discovery resource set 5 470, peer discovery resource set 6 472, peer discovery resource set 7 474, peer discovery resources set 8 476, peer discovery resource set 9 478, peer discovery resource set 10 480, peer discovery resource set 11 482, peer discovery resource set 12 484, peer discovery resource set 13 486, and peer discovery resource set 14 488.

A peer discovery communications channel may include the peer discovery resource sets associated with a set number. For example, a first peer discovery communications channel may comprise the peer discovery resource sets associated with set number 1 (402, 432, ..., 462). Similarly, a second peer discovery communications channel may comprise the peer discovery resource sets associated with set number 2 (404, 434, ..., 464), and so on.

In the example of FIG. 4 a peer discovery resource block is partitioned into 14 exemplary peer discovery resource sets. In other examples, a peer discovery resource block may include a different number of peer discovery resource sets. In some such embodiments, a peer discovery resource block includes greater than 100 peer discovery resource sets. In some embodiments, the same peer discovery resource sets are not necessarily included in each successive peer discovery resource block. In some embodiments, there may be multiple peer discovery resource sets corresponding to the same tone in a peer discovery resource block, e.g., a first peer discovery resource set for a first sub-time interval and a second peer discovery resource set for a sub-second time interval of the peer discovery interval.

Figure 5:
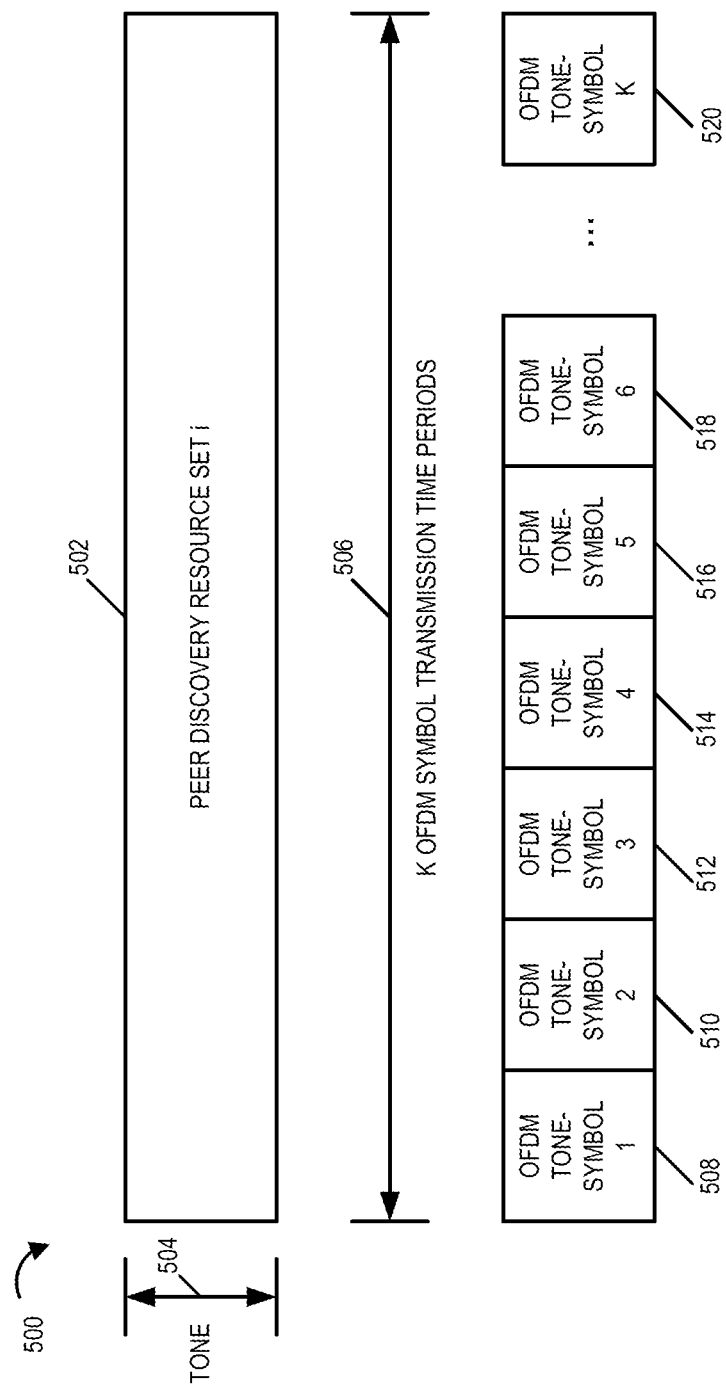
FIG. 5 is a drawing illustrating an exemplary peer discovery resource set.

FIG. 5 is a drawing 500 illustrating exemplary peer discovery resource set i 502. Exemplary peer discovery resource set i 502 may be any of the peer discovery resource sets illustrated in FIG. 4. Peer discovery resource set i 502 includes 1 tone 504 for the time duration of K OFDM symbol transmission time periods 506. Exemplary peer discovery resource set i 502 may be represented as K OFDM tone-symbols (OFDM tone-symbol 1 508, OFDM tone-symbol 2 510, OFDM tone-symbol 3 512, OFDM tone-symbol 4 514, OFDM tone-symbol 5 516, OFDM tone-symbol 6 518, ..., OFDM tone-symbol K 520). In some embodiments, K is an integer greater than or equal to eight. In one exemplary embodiment K=16, and there are 16 OFDM tone-symbols in a peer discovery resource set. In another exemplary embodiment K=64, and there are 64 OFDM tone-symbols in a peer discovery resource set. In some embodiments, $K_P$ of the K tone-symbols are pilot tone-symbols, where $K/K_P \geq 4$. In one embodiment K=64 and $K_P$=8. In one embodiment K=72 and $K_P$=8. In some embodiments, the full set of K tone-symbols correspond to the same tone.

Figure 6:
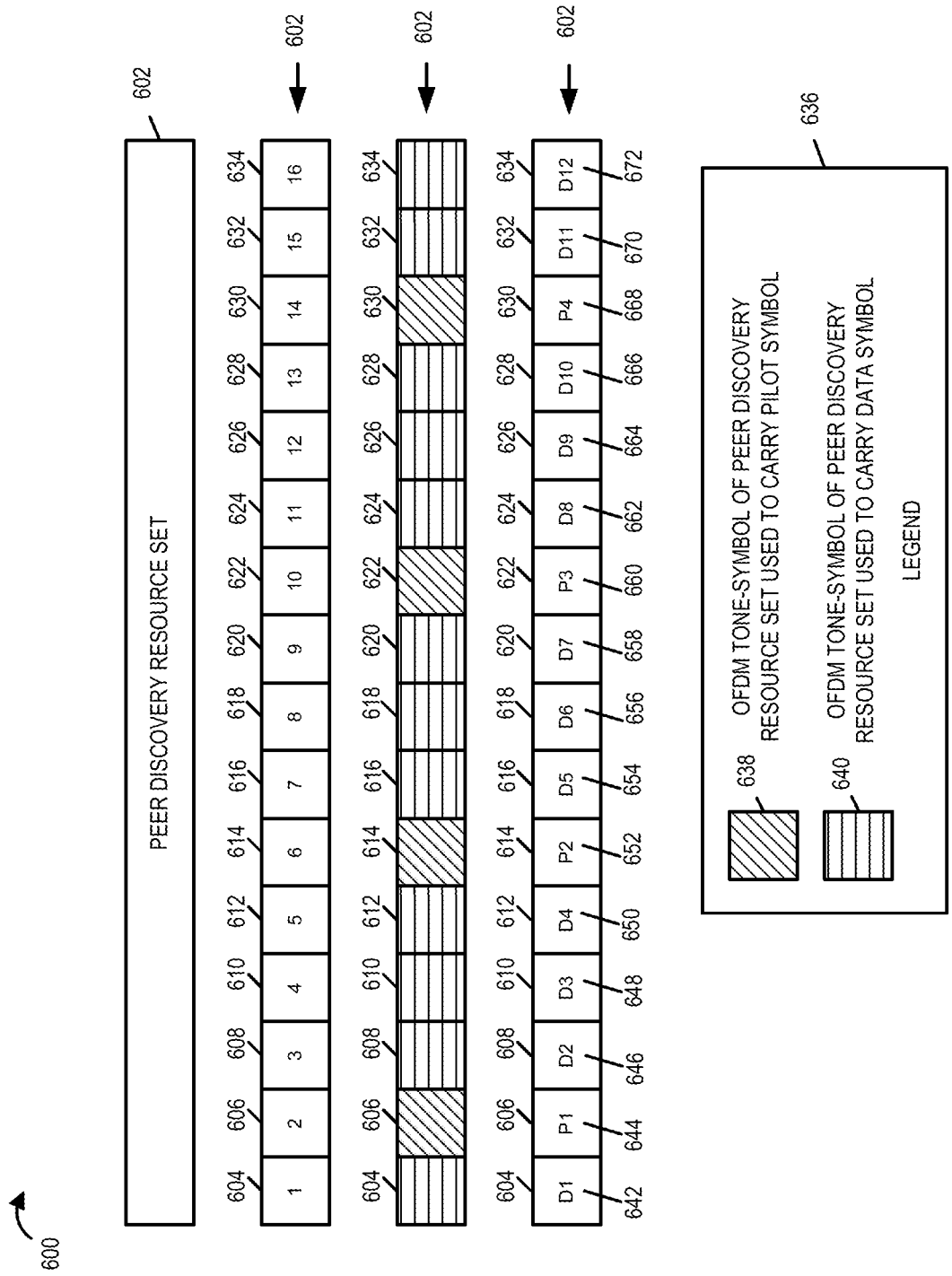
FIG. 6 is a drawing illustrating an exemplary peer discovery resource set used to carry pilot and data symbols.

FIG. 6 is a drawing 600 illustrating an exemplary peer discovery resource set 602 used to carry pilot and data symbols. Peer discovery resource set 602 is, e.g., peer discovery resource set 502 of FIG. 5, where K=16 and $K_P$=4. Exemplary peer discovery resource set 602 includes 16 indexed OFDM tone-symbols (tone-symbol 1 604, tone-symbol 2 606, tone-symbol 3 608, tone-symbol 4 610, tone-symbol 5 612, tone-symbol 6 614, tone-symbol 7 616, tone-symbol 8 618, tone-symbol 9 620, tone-symbol 10 622, tone-symbol 11 624, tone-symbol 12 626, tone-symbol 13 628, tone-symbol 14 630, tone-symbol 15 632 and tone-symbol 16 634).

Diagonal line shading, as indicated by box 638 of legend 636, indicates that an OFDM tone-symbol of the peer discovery resource set is used to carry a pilot symbol. Horizontal line shading, as indicated by box 640 of legend 636, indicates that an OFDM tone-symbol of the peer discovery resource set is used to carry a data symbol. In this example a first subset of tone-symbols (606, 614, 622 and 630) are designated to be used to carry pilot symbols, while a second non-overlapping subset of tone-symbols (604, 608, 610, 612, 616, 618, 620, 624, 626, 628, 632, 634) are used to carry the data symbols. In this example, the spacing between pilot designated tone-symbols is uniform with multiple data symbol designated tone-symbols being interspaced between the pilot designated tone-symbols. In some embodiments, the spacing between pilot designated tone-symbols is substantially uniform. In one embodiment, the tone-symbols designated to carry pilot symbols temporally precede the tone-symbols designated to carry data symbols. In some embodiments, the first and last tone-symbols of the peer discovery resource set are designated to carry pilot symbols.

In the example of FIG. 6, tone-symbols (606, 614, 622 and 630) carry pilot symbols (P1 644, P2 652, P3 660 and P4 668), respectively. In the example of FIG. 6, tone-symbols (604, 608, 610, 612, 616, 618, 620, 624, 626, 628, 632, 634) carry data symbols (D1 642, D2 646, D3 648, D4 650, D5 654, D6 656, D7 658, D8 662, D9 664, D10 666, D11 670, D12 672), respectively.

FIG. 7 is a drawing 700 illustrating an exemplary constant transmission power pattern used in some embodiments. For example, in some embodiments exemplary constant transmission power pattern A of FIG. 7 is used by a wireless communications device during peer discovery intervals (PD interval 1, PD interval 2, PD interval 3, PD interval 4, PD interval 5, PD interval 6, ... ) in a peer to peer timing structure when the wireless communications device transmits during a constant transmission power mode of operation. The vertical axis represents transmission power level, while the horizontal axis represents time. Power level Pc is the constant transmission power level used by both pilot signals and data signals transmitted during the peer discovery intervals. $P_P$ represents the power level of pilot signals, while $P_D$ represents the pilot level of data signals, which in this case both equal $P_C$.

FIG. 8 is a drawing 800 illustrating another exemplary constant transmission power pattern used in some embodiments. For example, in some embodiments exemplary constant transmission power pattern B of FIG. 8 is used by a wireless communications device during peer discovery intervals (PD interval 1, PD interval 2, PD interval 3, PD interval 4, PD interval 5, PD interval 6, ... ) in a peer to peer timing structure when the wireless communications device transmits during a constant transmission power mode of operation. The vertical axis represents transmission power level, while the horizontal axis represents time. Power level $P_{CP}$ is the constant transmission power level used by pilot signals transmitted during the peer discovery intervals. Power level $P_{CD}$ is the constant transmission power level used by data signals transmitted during the peer discovery intervals. $P_P$ represents the power level of pilot signals which equals $P_{CP}$, while $P_D$ represents the pilot level of data signals which equals $P_{CD}$. In the example of FIG. 8 pilot signals and data signals are transmitted at different constant power levels.

FIG. 9 is a drawing 900 illustrating an exemplary time varying transmission power pattern used in some embodiments. For example, in some embodiments exemplary time varying transmission power pattern A1 of FIG. 9 is used by a wireless communications device during peer discovery intervals (PD interval 1, PD interval 2, PD interval 3, PD interval 4, PD interval 5, PD interval 6, ... ) in a peer to peer timing structure when the wireless communications device transmits during a time varying transmission power mode of operation. The vertical axis represents transmission power level, while the horizontal axis represents time. In this example, there are three different power levels, $P_1$, $P_2$ and $P_3$, where $P_1>P_2>P_3$. $P_P$ represents the power level of the pilot signals, while $P_D$ represents the power level of the data signals. In this example, the pilot signals are transmitted at constant power level $P_1$ in each of the peer discovery intervals (PD interval 1, PD interval 2, PD interval 3, PD interval 4, PD interval 5, PD interval 6, ... ). However, the power level of the transmitted data signals varies as a function of time in accordance with a predetermined schedule. During peer discovery interval 1 data signals are transmitted at power level $P_1$; during peer discovery interval 2 data signals are transmitted at power level $P_2$; during peer discovery interval 3, data signals are transmitted at power level $P_3$. Then, the pattern repeats. During peer discovery interval 4 data signals are transmitted at power level $P_1$; during peer discovery interval 5 data signals are transmitted at power level $P_2$; during peer discovery interval 6, data signals are transmitted at power level $P_3$.

FIG. 10 is a drawing 1000 illustrating an exemplary time varying transmission power pattern used in some embodiments. For example, in some embodiments exemplary time varying transmission power pattern B1 of FIG. 10 is used by a wireless communications device during peer discovery intervals (PD interval 1, PD interval 2, PD interval 3, PD interval 4, PD interval 5, PD interval 6, ... ) in a peer to peer timing structure when the wireless communications device transmits during a time varying transmission power mode of operation. The vertical axis represents transmission power level, while the horizontal axis represents time. In this example, there are three different power levels, $P_1$, $P_2$ and $P_3$, where $P_1>P_2>P_3$. $P_P$ represents the power level of the pilot signals, while $P_D$ represents the power level of the data signals. The power level of the transmitted pilot signals and data signals varies as a function of time in accordance with a predetermined schedule. During peer discovery interval 1 pilot signals and data signals are transmitted at power level $P_1$; during peer discovery interval 2 pilot signals and data signals are transmitted at power level $P_2$; during peer discovery interval 3, pilot signals and data signals are transmitted at power level $P_3$. Then, the pattern repeats. During peer discovery interval 4 pilot signals and data signals are transmitted at power level $P_1$; during peer discovery interval 5 pilot signals and data signals are transmitted at power level $P_2$; during peer discovery interval 6, pilot signals and data signals are transmitted at power level $P_3$.

FIG. 11 is a drawing 1100 illustrating an exemplary time varying transmission power pattern used in some embodiments. For example, in some embodiments exemplary time varying transmission power pattern B2 of FIG. 11 is used by a wireless communications device during peer discovery intervals (PD interval 1, PD interval 2, PD interval 3, PD interval 4, PD interval 5, PD interval 6, ... ) in a peer to peer timing structure when the wireless communications device transmits during a time varying transmission power mode of operation. The vertical axis represents transmission power level, while the horizontal axis represents time. In this example, there are three different power levels, $P_1$, $P_2$ and $P_3$, where $P_1>P_2>P_3$. $P_P$ represents the power level of the pilot signals, while $P_D$ represents the power level of the data signals. The power level of the transmitted pilot signals and data signals varies as a function of time in accordance with a predetermined schedule. During peer discovery interval 1 pilot signals and data signals are transmitted at power level $P_2$; during peer discovery interval 2 pilot signals and data signals are transmitted at power level $P_3$; during peer discovery interval 3, pilot signals and data signals are transmitted at power level $P_1$. Then, the pattern repeats. During peer discovery interval 4 pilot signals and data signals are transmitted at power level $P_2$; during peer discovery interval 5 pilot signals and data signals are transmitted at power level $P_3$; during peer discovery interval 6, pilot signals and data signals are transmitted at power level $P_1$.

FIG. 12 is a drawing 1200 illustrating an exemplary time varying transmission power pattern used in some embodiments. For example, in some embodiments exemplary time varying transmission power pattern B3 of FIG. 12 is used by a wireless communications device during peer discovery intervals (PD interval 1, PD interval 2, PD interval 3, PD interval 4, PD interval 5, PD interval 6, ... ) in a peer to peer timing structure when the wireless communications device transmits during a time varying transmission power mode of operation. The vertical axis represents transmission power level, while the horizontal axis represents time. In this example, there are three different power levels, $P_1$, $P_2$ and $P_3$, where $P_1>P_2>P_3$. $P_P$ represents the power level of the pilot signals, while $P_D$ represents the power level of the data signals. The power level of the transmitted pilot signals and data signals varies as a function of time in accordance with a predetermined schedule. During peer discovery interval 1 pilot signals and data signals are transmitted at power level $P_3$; during peer discovery interval 2 pilot signals and data signals are transmitted at power level $P_1$; during peer discovery interval 3, pilot signals and data signals are transmitted at power level $P_2$. Then, the pattern repeats. During peer discovery interval 4 pilot signals and data signals are transmitted at power level $P_3$; during peer discovery interval 5 pilot signals and data signals are transmitted at power level $P_1$; during peer discovery interval 6, pilot signals and data signals are transmitted at power level $P_2$.

FIG. 13 is a drawing 1300 illustrating an exemplary time varying transmission power pattern used in some embodiments. For example, in some embodiments exemplary time varying transmission power pattern C1 of FIG. 1300 is used by a wireless communications device during peer discovery intervals (PD interval 1, PD interval 2, PD interval 3, PD interval 4, PD interval 5, PD interval 6, . . . ) in a peer to peer timing structure when the wireless communications device transmits during a time varying transmission power mode of operation. The vertical axis represents transmission power level, while the horizontal axis represents time. In this example, there are three different power levels, $P_1$, $P_2$ and $P_3$, where $P_1 > P_2 > P_3$. $P_P$ represents the power level of the pilot signals, while $P_D$ represents the power level of the data signals. The power level of the transmitted pilot signals and data signals varies as a function of time in accordance with a predetermined schedule. During peer discovery interval 1 pilot signals and data signals are transmitted at power level $P_3$; during peer discovery interval 2 pilot signals and data signals are transmitted at power level $P_3$; during peer discovery interval 3, pilot signals and data signals are transmitted at power level $P_1$. During peer discovery interval 4 pilot signals and data signals are transmitted at power level $P_1$; during peer discovery interval 5 pilot signals and data signals are transmitted at power level $P_2$; during peer discovery interval 6, pilot signals and data signals are transmitted at power level $P_2$. Then, the pattern repeats.

FIG. 14 is a drawing 1400 illustrating an exemplary time varying transmission power pattern used in some embodiments. For example, in some embodiments exemplary time varying transmission power pattern D1 of FIG. 14 is used by a wireless communications device during peer discovery intervals (PD interval 1, PD interval 2, PD interval 3, PD interval 4, PD interval 5, PD interval 6, . . . ) in a peer to peer timing structure when the wireless communications device transmits during a time varying transmission power mode of operation. The vertical axis represents transmission power level, while the horizontal axis represents time. In this example, there are four different power levels, $P_{CP}$, $P_1$, $P_2$ and $P_3$, where $P_{CP} > P_1 > P_2 > P_3$. $P_P$ represents the power level of the pilot signals, while $P_D$ represents the power level of the data signals. In this example, the pilot signals are transmitted at constant power level $P_{CP}$ in each of the peer discovery intervals (PD interval 1, PD interval 2, PD interval 3, PD interval 4, PD interval 5, PD interval 6, . . . ). However, the power level of the transmitted data signals varies as a function of time in accordance with a predetermined schedule. During peer discovery interval 1 data signals are transmitted at power level $P_1$; during peer discovery interval 2 data signals are transmitted at power level $P_2$; during peer discovery interval 3, data signals are transmitted at power level $P_3$. Then, the pattern repeats. During peer discovery interval 4 data signals are transmitted at power level $P_1$; during peer discovery interval 5 data signals are transmitted at power level $P_2$; during peer discovery interval 6, data signals are transmitted at power level $P_3$.

FIG. 15 is a drawing 1500 illustrating an exemplary time varying transmission power pattern used in some embodiments. For example, in some embodiments exemplary time varying transmission power pattern D2 of FIG. 15 is used by a wireless communications device during peer discovery intervals (PD interval 1, PD interval 2, PD interval 3, PD interval 4, PD interval 5, PD interval 6, . . . ) in a peer to peer timing structure when the wireless communications device transmits during a time varying transmission power mode of operation. The vertical axis represents transmission power level, while the horizontal axis represents time. In this example, there are four different power levels, $P_{CP}$, $P_1$, $P_2$ and $P_3$, where $P_{CP} > P_1 > P_2 > P_3$. $P_P$ represents the power level of the pilot signals, while $P_D$ represents the power level of the data signals. In this example, the pilot signals are transmitted at constant power level $P_{CP}$ in each of the peer discovery intervals (PD interval 1, PD interval 2, PD interval 3, PD interval 4, PD interval 5, PD interval 6, . . . ). However, the power level of the transmitted data signals varies as a function of time in accordance with a predetermined schedule. During peer discovery interval 1 data signals are transmitted at power level $P_2$; during peer discovery interval 2 data signals are transmitted at power level $P_3$; during peer discovery interval 3, data signals are transmitted at power level $P_1$. Then, the pattern repeats. During peer discovery interval 4 data signals are transmitted at power level $P_2$; during peer discovery interval 5 data signals are transmitted at power level $P_3$; during peer discovery interval 6, data signals are transmitted at power level $P_1$.

FIG. 16 is a drawing 1600 illustrating an exemplary time varying transmission power pattern used in some embodiments. For example, in some embodiments exemplary time varying transmission power pattern D3 of FIG. 16 is used by a wireless communications device during peer discovery intervals (PD interval 1, PD interval 2, PD interval 3, PD interval 4, PD interval 5, PD interval 6, . . . ) in a peer to peer timing structure when the wireless communications device transmits during a time varying transmission power mode of operation. The vertical axis represents transmission power level, while the horizontal axis represents time. In this example, there are four different power levels, $P_{CP}$, $P_1$, $P_2$ and $P_3$, where $P_{CP} > P_1 > P_2 > P_3$. $P_P$ represents the power level of the pilot signals, while $P_D$ represents the power level of the data signals. In this example, the pilot signals are transmitted at constant power level $P_{CP}$ in each of the peer discovery intervals (PD interval 1, PD interval 2, PD interval 3, PD interval 4, PD interval 5, PD interval 6, . . . ). However, the power level of the transmitted data signals varies as a function of time in accordance with a predetermined schedule. During peer discovery interval 1 data signals are transmitted at power level $P_3$; during peer discovery interval 2 data signals are transmitted at power level $P_1$; during peer discovery interval 3, data signals are transmitted at power level $P_2$. Then, the pattern repeats. During peer discovery interval 4 data signals are transmitted at power level $P_3$; during peer discovery interval 5 data signals are transmitted at power level $P_1$; during peer discovery interval 6, data signals are transmitted at power level $P_2$.

In some embodiments, the power level $P_D$, e.g., described in one or more of FIGS. 8, 9, 10, 11, 12, 13, 14, 15, and/or 16, represents any average power level per tone-symbol based on the tone-symbols which carry data in the peer discovery interval. In some embodiments, the power level $P_P$, e.g., described in one or more of FIGS. 8, 9, 10, 11, 12, 13, 14, 15, and/or 16, represents a per tone-symbol power level for the tones which carry a pilot in the peer discovery interval.

Figure 17:
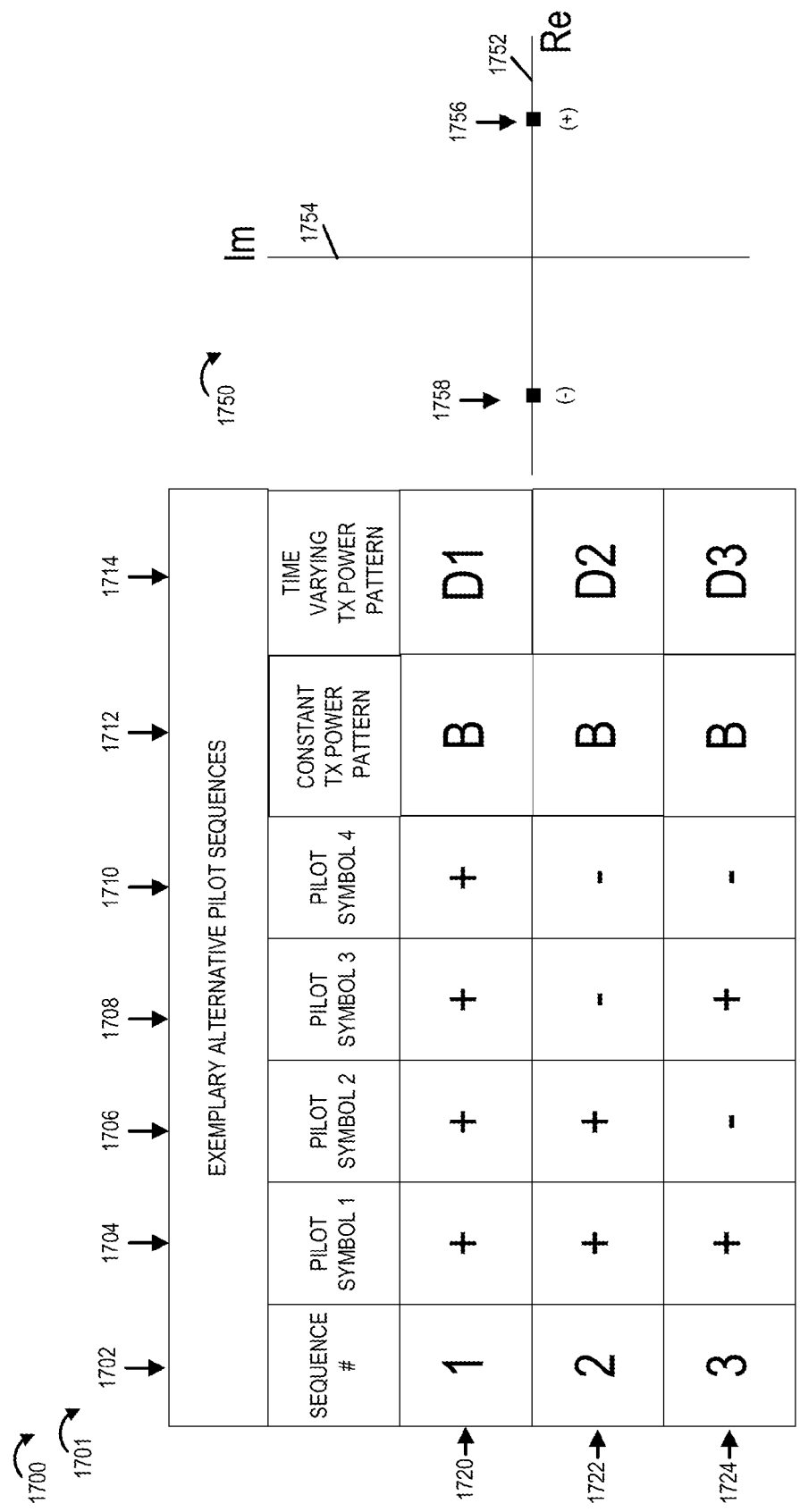
FIG. 17 illustrates exemplary alternative pilot sequences associated with different time varying transmission power patterns, used in some embodiments.

FIG. 17 illustrates exemplary alternative pilot sequences associated with different time varying transmission power patterns, used in some embodiments. FIG. 17 includes a drawing 1700 illustrating a table of exemplary alternative pilot sequences 1701 and a plot 1750 illustrating mapping of a set of two pilot symbols to a complex plane. Plot 1750 includes horizontal axis 1752 representing the real axis and vertical axis 1754 representing the Imaginary axis. Pilot symbol designated as "+" 1756 maps along the real axis with a phase angle of 0 degrees, while a pilot symbol designated as "−" 1758 maps along the real axis with a phase angle of 180 degrees. The transmit power level of the "+" pilot symbol is the same as the transmit power level of the "−" pilot symbol within a peer discovery resource set during a peer discovery interval. It should be appreciated that the use of different pilot sequences improves utilization and reuse of transmission resources and helps in mitigating interference problems.

Table 1701 includes a first column 1702 representing pilot sequence number, a second column 1704 identifying pilot symbol 1 for each of the alternative pilot sequences, a third column 1706 identifying pilot symbol 2 for each of the alternative pilot sequences, a fourth column 1708 identifying pilot symbol 3 for each of the alternative pilot sequences, and a fifth column 1710 identifying pilot symbol 4 for each of the alternative pilot sequences. The sixth column 1712identifies the constant transmission power pattern used when the wireless terminal is operating in a constant transmission power mode of operation and has selected to use a particular pilot sequence; and the seventh column 1714 identifies the time varying transmission pattern used when the wireless terminal is operating in a time varying transmission power mode of operation and has selected to use a particular pilot sequence.

First row 1720 indicates that pilot sequence 1 follows the pattern +, +, +, +. First row 1720 also indicates that when a wireless communications device is transmitting its peer discovery signals and has selected to use pilot sequence 1, the wireless communications device follows constant transmission pattern B of FIG. 8 if operating in a constant transmission power mode of operation, and the wireless communications device follows time varying transmission pattern D1 of FIG. 14 when operating in a time varying transmission power mode of operation. Second row 1722 indicates that pilot sequence 2 follows the pattern +, +, −, −. Second row 1722 also indicates that when a wireless communications device is transmitting its peer discovery signals and has selected to use pilot sequence 2, the wireless communications device follows constant transmission pattern B of FIG. 8 if operating in a constant transmission power mode of operation, and the wireless communications device follows time varying transmission pattern D2 of FIG. 15 when operating in a time varying transmission power mode of operation. Third row 1724 indicates that pilot sequence 3 follows the pattern +, −, +, −. Third row 1724 also indicates that when a wireless communications device is transmitting its peer discovery signals and has selected to use pilot sequence 3, the wireless communications device follows constant transmission pattern B of FIG. 8 if operating in a constant transmission power mode of operation, and the wireless communications device follows time varying transmission pattern D3 of FIG. 16 when operating in a time varying transmission power mode of operation. In some embodiments, the power level $P_1$ of FIGS. 14, 15 and 16 equals the power level $P_{CD}$ of FIG. 8.

Consider a scenario of low network congestion, in which a single device is transmitting on a particular peer discovery resource channel, e.g., the single device is transmitting peer discovery signals into the peer discovery resources identified with set 2 (404, 434, ..., 464) of FIG. 4. The single device has selected to use one of the three alternative pilot sequences. Further consider that each of the peer discovery resource sets (404, 434, 464) is in accordance with the structure of drawing 600 of FIG. 6. Further consider that constant transmission power pattern B of FIG. 8 is used.

Now consider a scenario of high network congestion, in which multiple devices are transmitting on a particular peer discovery resource channel, e.g., the multiple devices are concurrently transmitting peer discovery signals into the peer discovery resources identified with set 2 (404, 434, ..., 464) of FIG. 4. Consider that three different devices have selected to use different ones of the three alternative pilot sequences. Further consider the each of the peer discovery resource sets (404, 434, 464) is in accordance with the structure of drawing 600 of FIG. 6. A first wireless communications device transmits its peer discovery signals in accordance with time varying transmission pattern D1 of FIG. 14. A second wireless communications device transmits its peer discovery signals in accordance with time varying transmission pattern D2 of FIG. 15. A third wireless communications device transmits its peer discovery signals in accordance with time varying transmission pattern D3 of FIG. 16.

In some embodiments, a wireless communications device may, and sometimes does, transmits the same peer discovery data signals multiple times, e.g., to increase the likelihood that its peer discovery data will be detected and successfully recovered by other devices. For example, if the first, second and third wireless communications devices transmit the same peer discovery data for three consecutive peer discovery intervals, some devices may be able to successfully recover peer discovery data that they would otherwise be unable to if constant transmission patterns were used. The different time varying transmission patterns D1 of FIG. 14, D2 of FIG. 15 and D3 of FIG. 16 are intentionally structured such that the maximum data transmission power level for data signals (P1) occurs during different peer discovery intervals.

Figure 18B:
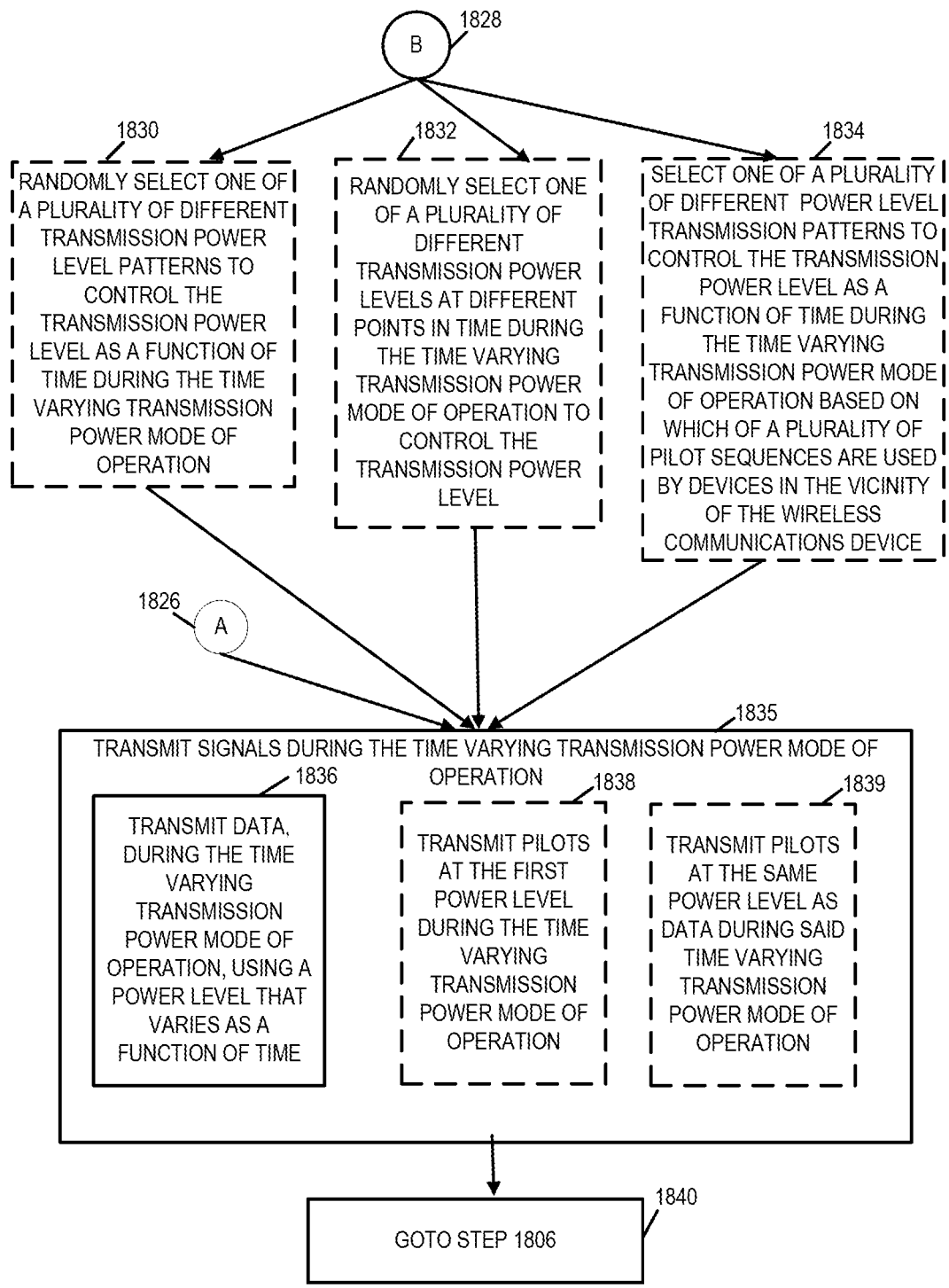
FIG. 18B is a second part of a flowchart of an exemplary method of operating a wireless communications device, in accordance with an exemplary embodiment.

FIG. 18, comprising the combination of FIG. 18A and FIG. 18B, is a flowchart 1800 of an exemplary method of operating a wireless communications device, in accordance with an exemplary embodiment. The exemplary communications device implementing the method of flowchart 1800 supports a constant transmission power mode of operation and a time varying transmission power mode of operation, e.g., with regard to peer discovery transmission signaling. In some embodiments, the constant transmission power mode of operation and the time varying transmission power mode of operation are used for transmitting broadcast signals. In some such embodiments, the broadcast signals are peer discovery signals. In some embodiments, the wireless communications device implementing the method of flowchart 1800 is a wireless terminal in an ad hoc communications network. In various embodiments, the wireless terminal is a handheld device that does not operate as a base station.

Operation starts in step 1802, where the wireless communications device is powered on and initialized and proceeds to step 1804. In step 1804, the wireless communications device initializes the current mode of operation, e.g., to a constant transmission power mode of operation. Operation proceeds from step 1804 to step 1806.

In step 1806, the wireless communications device monitors a set of transmission resources. Then in step 1808 the wireless communications device determines an amount of network congestion. In some embodiments, in step 1808 the wireless communications device determines an amount of network congestion based on energy detected on the set of transmission resources. In some embodiments, the set of transmission resources is a set of peer discovery resources. Operation proceeds from step 1808 to step 1810.

In step 1810 the wireless communications device switches between the constant transmission power mode of operation and said time varying transmission power mode of operation as a function of the determined amount of network congestion. Step 1810 includes steps 1812, 1814, 1816, 1818, and 1820.

In step 1812 the wireless communications compares the determined amount of network congestion to a threshold, e.g., a predetermined congestion threshold. If the determined amount of congestion from step 1808 is above the threshold, operation proceeds from step 1812 to step 1818; otherwise, operation proceeds from step 1812 to step 1814.

In step 1814 the wireless communications device determines if its current mode of operation is the constant transmission power mode of operation. If the current mode of operation is the constant transmission power mode of operation, then operation proceeds from step 1814 to step 1821. However, if the current mode of operation is not the constant transmission power mode of operation, then operation proceeds from step 1814 to step 1816. In step 1816 the wireless communications device switches from a time varying transmission power mode of operation to the constant transmission power mode of operation. Operation proceeds from step 1816 to step 1821.

In step 1821 the wireless communications device transmits signals during a constant transmission power mode of operation. Step 1821 includes step 1822. In some embodiments, step 1821 includes step 1824. In some embodiments step 1821 includes step 1825. In step 1822 the wireless communications device transmits data, during a constant transmission power mode of operation, at a constant transmission power level. In some embodiments, the constant transmission power level is an average power level. In step 1824, the wireless communications device transmits pilots at a first power level during the constant transmission power mode of operation. In step 1825 the wireless communications device transmits pilots at the same power level as data during said constant transmission power mode of operation. Operation proceeds from step 1821 to step 1806 for monitoring of the set of transmission resources.

Returning to step 1818, in step 1818 the wireless communications device determines if the current mode of operation is the time varying transmission power mode of operation. If the current mode of operation is the time varying transmission power mode of operation, then operation proceeds from step 1818 via connecting node A 1826 to step 1835. However, if the current mode of operation is not the time varying mode of operation, then operation proceeds from step 1818 to step 1820. In step 1820 the wireless communications device switches from the constant transmission power mode of operation to the time varying transmission power mode of operation. In some embodiments, operation proceeds from step 1820 via connecting node B 1828 to one of alternatives steps 1830, 1832, 1834. In other embodiments, operation proceeds from step 1820 via connecting node B 1828 to step 1835.

Returning to step 1830, in step 1830 the wireless communications device randomly selects one of a plurality of different transmission power level patterns to control the transmission power level as a function of time during the time varying transmission power mode of operation. Operation proceeds from step 1830 to step 1835.

Returning to step 1832, in step 1832 the wireless communications device randomly selects one of a plurality of different transmission power levels at different points in time during the time varying transmission power mode of operation to control the transmission power level. Operation proceeds from step 1832 to step 1835.

Returning to step 1834, in step 1834 the wireless communications device selects one of a plurality of different power level transmission patterns to control the transmission power level as a function of time during the time varying transmission power mode of operation based on which one of a plurality of pilot sequences are used by devices in the vicinity of the wireless communications device. For example, the wireless communications device selects a power level transmission pattern associated with a pilot sequence which is not being used by other devices in its vicinity. In some embodiments, in step 1834 the wireless communications device selects one of a plurality of different power level transmission patterns to control the transmission power level as a function of time during the time varying transmission power mode of operation based on which one of a plurality of pilot sequences are used by devices in the vicinity of the wireless communications device which use the same wireless resources for transmission. For example, the wireless communications device selects a power level transmission pattern associated with a pilot sequence which is not being used by other devices in its vicinity which are using the same wireless resources for transmission. Operation proceeds from step 1834 to step 1835.

In step 1835 the wireless communications device transmits signals during the time varying transmission power mode of operation. Step 1835 includes step 1836. In some embodiments, step 1835 includes step 1838. In some embodiments, step 1835 includes step 1839. In step 1836 the wireless communications device transmits data, during the time varying transmission power mode of operation, using a power level that varies as a function of time. In some embodiments, the signals transmitted during the time varying power mode of operation are broadcast signals which are peer discovery signals, and transmitting data during the time varying transmission power mode of operation includes transmitting the same peer discovery information multiple times, at different power levels during different peer discovery transmission time periods. In some embodiments, data is transmitted during the time varying transmission mode of operation, at different times, and at least three different power levels are used. In some such embodiments, the at least three different power levels differ from one another by at least 3 dBs.

In step 1838, the wireless communications device transmits pilots at the first power level during the time varying power mode of operation. In step 1839 the wireless communications device transmits pilots at the same power level as data during said time varying transmission power mode of operation. In some embodiments, the pilots are transmitted using a different pilot sequence than is used by a neighboring communications device using the same pilot transmission resources as the wireless communications device is using. In some embodiments, during the time varying transmission mode of operation, the wireless communications device occasionally, refrains from transmitting, e.g., so it can listen on the common shared resource that it using. Operation proceeds from step 1835 to step 1840, in which operation proceeds to step 1806.

From the above discussion, it should be appreciated that one way to minimize interference between devices sharing one or more same transmission resources, is to have the devices sharing the transmission resources use different transmission power levels for transmitting data, e.g., during different peer discovery intervals. In various embodiments, an individual transmission resource in a set of transmission resources is a tone-symbol, e.g., an OFDM tone-symbol, and a signal transmitted on an individual transmission resource is a modulation symbol. In some embodiments, each set of transmission resources is a set of contiguous OFDM tone-symbols corresponding to a single tone for a predetermined number of symbol transmission time period. In some embodiments, a device acquires a peer discovery resource ID associated with sets of peer discovery resources in a peer to peer timing structure. The wireless communications device transmits, e.g., broadcasts, peer discovery signals, on its acquired peer discovery resources. However, the wireless communications device occasionally ceases transmission, and listens on its acquired peer discovery resource to detect for the presence of other devices which may be concurrently transmitting on its acquired peer discovery resources, e.g., using different pilot symbols sequences.

Figure 19:
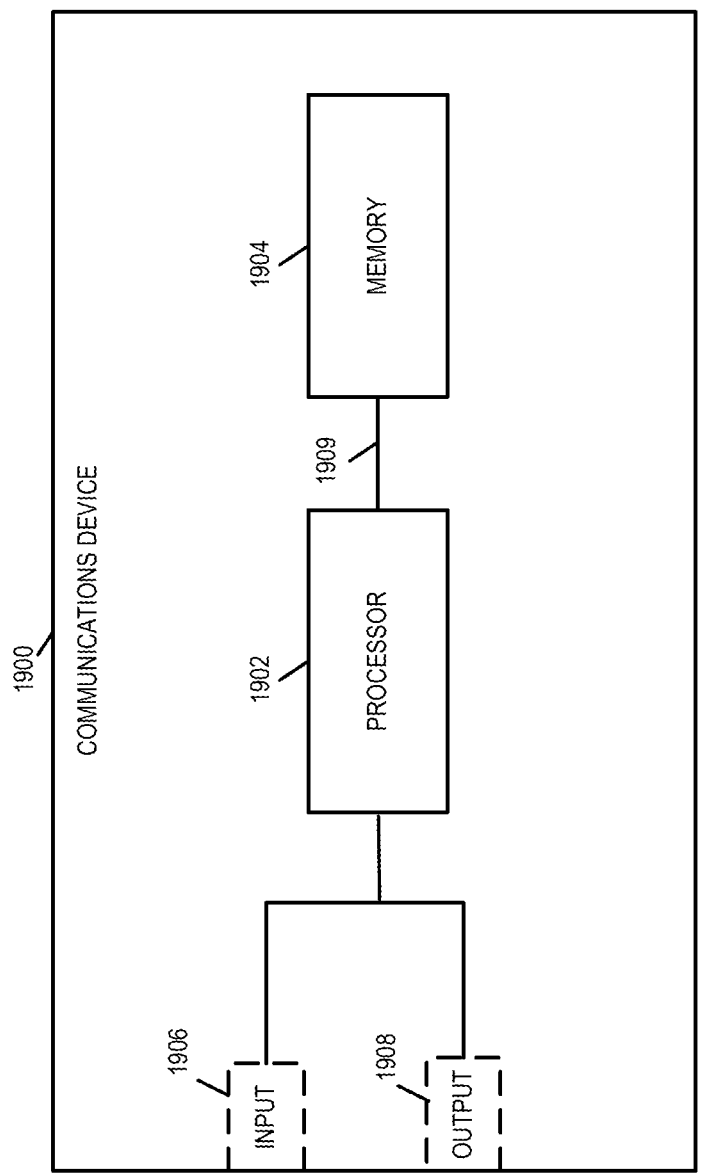
FIG. 19 illustrates an exemplary communications device, e.g., a mobile wireless terminal supporting peer to peer communications, in accordance with an exemplary embodiment.

FIG. 19 is a drawing of an exemplary communications device 1900 in accordance with one exemplary embodiment. Communications device 1900 may be, and in at least one embodiment is, a mobile wireless terminal supporting peer to peer communications and implementing a method in accordance with flowchart 1800 of FIG. 18. The communications device 1900 is, e.g., exemplary communication device 1 102 of FIG. 1. In some embodiments, communications device 1900 is a wireless terminal in an ad hoc communications network. In some such embodiments, communications device 1900 is a wireless terminal which is a handheld device that does not operate as a base station. Communications device 1900 includes a processor 1902 and memory 1904 coupled together via a bus 1909 over which the various elements (1902, 1904) may interchange data and information. Communications device 1900 further includes an input module 1906 and an output module 1908 which may be coupled to the processor 1902 as shown. However, in some embodiments the input module and output module 1906, 1908 are located internal to the processor 1902. Input module 1906 can receive input signals. Input module 1906 can, and in some embodiments does, include a wireless receiver and/or a wired or optical input interface for receiving input. Output module 1908 may include, and in some embodiments does include, a wireless transmitter and/or a wired or optical output interface for transmitting output.

Processor 1902 is configured to: transmit data during a constant transmission power mode of operation, at a constant transmission power level and transmit data during a time varying transmission power mode of operation, using a power level that varies as a function of time. In some embodiments the constant transmission power mode of operation and the time varying transmission power mode of operation are used for transmitting broadcast signals. In some embodiments the broadcast signals are peer discovery signals. In some embodiments the processor 1902 is configured to transmit, during the time varying transmission power mode of operation, the same peer discovery information multiple times at different power levels during different peer discovery transmission time periods. In some embodiments the processor 1902 is configured to transmit data during the time varying transmission mode of operation, at different times, at least at three different power levels. In some embodiments the at least three different power levels differ from one another by at least 3 dB.

Processor 1902 is further configured to determine an amount of network congestion, e.g., based on the amount of energy detected on a set of transmission resources, e.g., peer discovery transmission resources. In some embodiments the processor 1902 is further configured to switch between the constant transmission power mode of operation and the time varying transmission power mode of operation as a function of the determined amount of network congestion. In some embodiments processor 1902 is further configured to randomly select one of a plurality of different transmission power level patterns to control the transmission power level as a function of time for operation in the time varying mode of operation. In some embodiments the processor 1902 is configured to randomly select one of a plurality of different transmission power levels at different points in time during the time varying transmission power mode of operation to control the transmission power level. The processor 1902 in some embodiments is configured to select one of a plurality of different transmission power level patterns to control the transmission power level as a function of time during the time varying transmission power mode of operation based on which of a plurality of pilot sequences are used by devices in the vicinity of the communications device 1900.

The processor 1902, in some embodiments, is further configured to transmit pilots at a first power level during the constant transmission power mode of operation. In some such embodiments the processor 1902 is further configured to transmit pilots at said first power level during the time varying transmission power mode of operation. In some embodiments the pilots are transmitted using a different pilot sequence than is used by a neighboring communications device using the same pilot transmission resources as the communications device 1900.

Processor 1902, in some embodiments, is configured to transmit pilots at the same power level as data during said constant transmission power mode of operation. In some embodiments, processor 1902 is configured to transmit pilots at the same power level as data during said time varying transmission power mode of operation.

Figure 20:
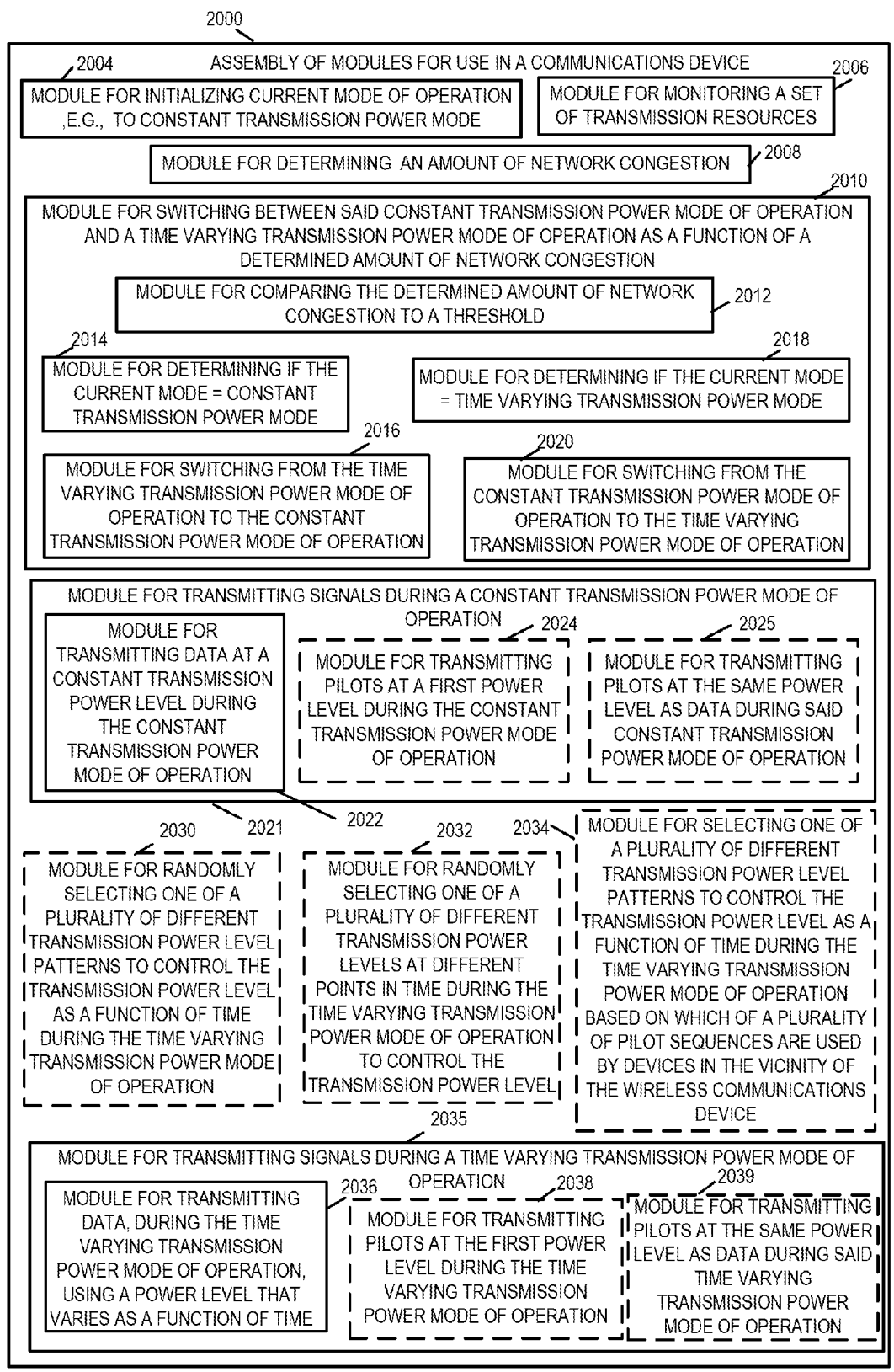
FIG. 20 illustrates an assembly of modules which can be used in the exemplary communications device of FIG. 19.

FIG. 20 is an assembly of modules 2000 which can, and in some embodiments are, used in the communications device 1900 illustrated in FIG. 19. The modules in the assembly 2000 can be implemented in hardware within the processor 1902 of FIG. 19, e.g., as individual circuits. Alternatively, the modules may be implemented in software and stored in the memory 1904 of the communications device 1900 shown in FIG. 19. While shown in the FIG. 19 embodiment as a single processor, e.g., computer, it should be appreciated that the processor 1902 may be implemented as one or more processors, e.g., computers.

When implemented in software the modules include code, which when executed by the processor 1902, configure the processor to implement the function corresponding to the module. In embodiments where the assembly of modules 2000 is stored in the memory 1904, the memory 1904 is a computer program product comprising a computer readable medium comprising code, e.g., individual code for each module, for causing at least one computer, e.g., processor 1902, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 20 control and/or configure the communications device 1900 or elements therein such as the processor 1902, to perform the functions of the corresponding steps illustrated in the method flowchart 1800 of FIG. 18.

The assembly of modules 2000 includes a module corresponding to each step of the method shown in FIG. 18. A module in FIG. 20 performs or controls the processor 1902 to perform a corresponding step, e.g., a step shown and/or described with respect to FIG. 18. For example module 2004 corresponds to step 1804 and is responsible for performing the operation described with regard to step 1804.

As illustrated in FIG. 20, the assembly of modules 2000 includes a module 2004 for initializing current mode of device operation, e.g. to constant transmission power mode of operation, a module 2006 for monitoring a set of transmission resources, e.g. for monitoring peer discovery resources, and a module 2008 for determining an amount of network congestion, e.g., based on an amount of energy detected on the set of transmission resources. The assembly of modules 2000 further includes a module 2010 for switching between said constant transmission power mode of operation and a time varying transmission power mode of operation as a function of a determined amount of network congestion. Module 2010 includes a module 2012 for comparing the determined amount of network congestion to a threshold, a module 2014 for determining if the current mode is the constant transmission power mode, a module 2016 for switching from the time varying transmission power mode of operation to the constant transmission power mode of operation, a module 2018 for determining if the current mode of operation is the time varying transmission power mode of operation, and a module 2020 for switching from the constant transmission power mode of operation to the time varying transmission power mode of operation.

Assembly of modules 2000 further includes a module 2021 for transmitting signals during a constant transmission power mode of operation and a module 2035 for transmitting signals during a time varying transmission power mode of operation. Module 2021 includes a module 2022 for transmitting data at a constant power level during the constant transmission power mode of operation. In various embodiments, the constant transmission power level is an average power. In some embodiments, module 2021 includes a module 2024 for transmitting pilots at a first power level during the constant transmission power mode of operation. In some embodiments, module 2021 includes a module 2025 for transmitting pilots at the same power level as data during said constant transmission power mode of operation.

Module 2035 includes a module 2036 for transmitting data, during the time varying transmission power mode of operation, using a power level that varies as a function of time. In some embodiments, module 2035 includes a module 2038 for transmitting pilots at the first power level during the time varying transmission power mode of operation. In some embodiments, module 2035 includes a module 2039 for transmitting pilots at the same power level as data during said time varying transmission power mode of operation.

In some embodiments the module 2038 for transmitting pilots uses a different pilot sequence than is used by a neighboring communications device using the same pilot transmission resources as the communications device 1900. In some embodiments the data is transmitted by module 2036 during the time varying transmission power mode of operation at different times, at least at three different power levels.

In some embodiments, the assembly of modules 2000 includes one or more of: a module 2030 for randomly selecting one of a plurality of different transmission power level patterns to control the transmission power level as a function of time during said time varying transmission power mode of operation, a module 2032 for randomly selecting one of a plurality of different transmission power levels at different points in time during said time varying transmission power mode of operation to control the transmission power level, a module 2034 for selecting one of a plurality of different transmission power level patterns to control the transmission power level as a function of time during the time varying transmission power mode of operation based on which of a plurality of pilot sequences are used by devices in the vicinity of said wireless communications device. In some embodiments, module 2034 selects one of a plurality of different transmission power level patterns to control the transmission power level as a function of time during the time varying transmission power mode of operation based on which of a plurality of pilot sequences are used by devices in the vicinity of said wireless communications device which use the same wireless resources for transmission.

The modules that are shown using dashed boxes indicate that although these modules are included in the assembly of modules 2000 in various embodiments, the processor 1902 may execute such a module in embodiments where the step to which these modules correspond, is performed. In some embodiments, one or more modules shown in FIG. 20 which are included within another module may be implemented as an independent module or modules. For example, module 2012, in some embodiments, may be implemented as a standalone module with regard to module 2010.

Various features and aspects, used in some, but not necessarily all embodiments, will be described. Various exemplary described methods and apparatus relate to transmission power adaptation for transmitting, e.g., broadcasting, signals, in a wireless peer to peer network. Various described methods and apparatus are well suited for using an ad hoc peer to peer wireless communications system in which limited air resources are reused by different devices, e.g., at different but potentially nearby locations.

In various peer to peer networks, it is desirable to include some intervals in the peer to peer timing structure where each device in the network can have some air link resources to broadcast peer discovery information and/or listen for peer discovery information from other devices, e.g., peer discovery time intervals. However, the total amount of air link resources in the timing structure are limited and allocation of air link resources for peer discovery purposes takes away from other potential uses, e.g., peer to peer traffic signaling.

In some embodiments, the communications resources allocated for peer discovery are limited, while the number of users in the system can be very large in a dense deployment. Various exemplary methods and apparatus use the available peer discovery airlink resources efficiently by varying the transmit power of devices, e.g., when the network becomes dense.

In a sparse deployment environment, where peer discovery range is limited by, e.g., thermal noise, as opposed to interfering transmission, more devices can broadcast their peer discovery information using maximum possible transmit power. However, when the network becomes dense, multiple devices (even with geometrical proximity) might start to share the same set of communications resources and the peer discovery quality becomes interference limited. In such a scenario, variation in transmit power control can be very beneficial to the system.

In some embodiments, in addition to variation of the transmit power, different pilot phases, e.g., different pilot sequences, are available and used to further improve performance. In accordance with one feature, of some embodiments, a communications device keeps silent during at least some peer discovery time intervals to periodically listen to the peers who might be sharing its peer discovery transmission resources. In some embodiments, if the detected power on the peer discovery transmission resources is much larger than the decodable energy threshold and yet the listening device is unable to decode the signal/information carried by the set of peer discovery resources, this can be a good indication that there are more than one closeby devices sharing the same set of transmission resources with the communications device. In some embodiments, when such a condition is detected, the device detecting the condition considers that the network congestion level is high enough and triggers a transition from a constant transmission power mode of operation to a time varying transmission power mode of operation with regard to peer discovery.

Thus, after the high level of network congestion is detected, the communications device may, and sometimes does, transition to a time varying transmission power mode of operation with regard to peer discovery intervals. In one exemplary embodiment, the communications device transmits at different power levels during different time slots, e.g., the device transmits its peer discovery data signals at different transmit power levels during different peer discovery intervals. For example, a user can transmit at full power in ⅓ of its peer discovery time intervals, transmit at a power −3 dB away from the full power level in another ⅓ fraction of its peer discovery time intervals and transmit at a power −6 dB from the full power level in the remaining ⅓ fraction of its peer discovery time intervals. The particular choice of the amount of power backoff can be, and in some embodiments is, dependent on the decodable SNR threshold of the peer discovery codec. In the scenarios where orthogonal pilot phases are not available, a user can pick ⅓ of the time slots and/or the backoff amount in a pseudo random manner, based on, e.g., its identity or another characteristic or property which is unique about itself. Also, during a silence period in its peer discovery time intervals, when the device monitors for activity from other devices using the same peer discovery resources as it is using, a user can get an opportunity to predict the choice of its neighbors and can use this information to tune its transmit power accordingly.

In some embodiments, a given time slot, e.g., for a given peer discovery time interval in the recurring peer to peer timing structure, locally devices sharing the same set of peer discovery resources intentionally select to use different transmit power levels. In some embodiments where pilot phases are available, this goal is achieved by enforcing each user to pick the transmit power pattern based on its pilot phase, which is supposed to be locally unique.

Figure 21:
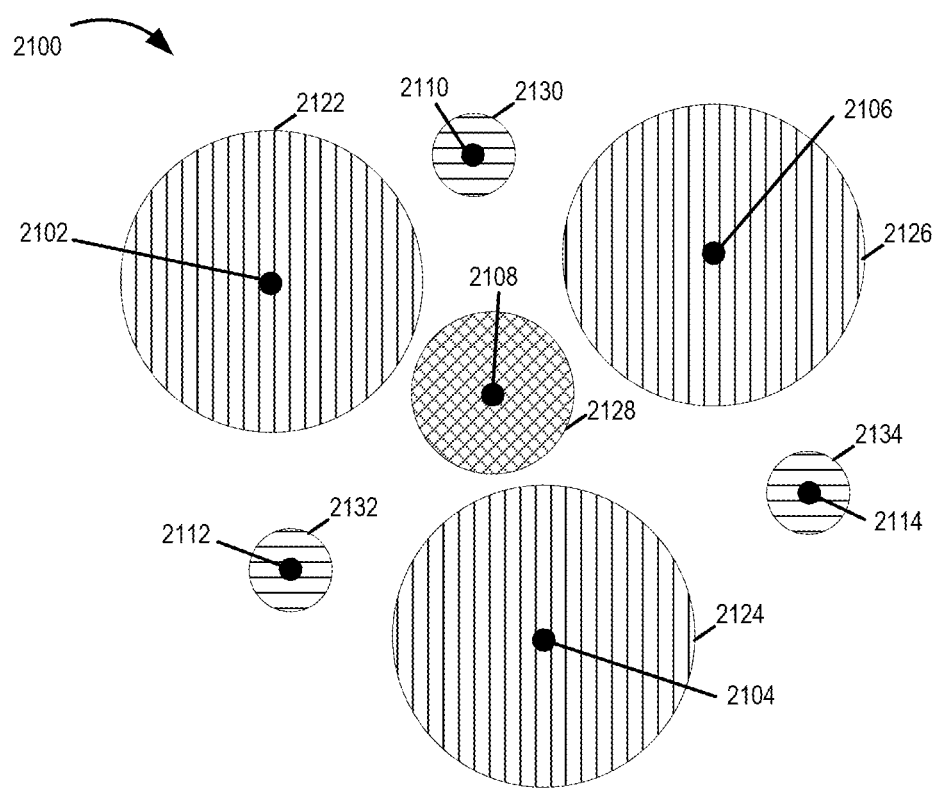
FIG. 21 illustrates an example where different devices sharing the same set of transmission resources during a first time are using different transmission power levels for transmitting, based on their pilot phases.

FIG. 21 includes a drawing 2100 illustrating an example with three pilot phases being used by devices. The devices (2102, 2104, 2106, 2108, 2110, 2112, 2114) in the example are represented by small solid dots. Each device (2102, 2104, 2106, 2108, 2110, 2112, 2114) is surrounded by a corresponding circle (2122, 2124, 2126, 2128, 2130, 2132, 2134), respectively, where the size of a circle is used to represent a transmission power level. Different pilot phases are shown using different patterns used to fill the circles, e.g., vertical lines pattern, horizontal lines pattern and the hashed lines pattern. In this example, during a first time, devices 2102, 2104 and 2106 use a first pilot phase which is represented by the vertical lines pattern, and the devices (2102, 2104, 2106) are transmitting at a high, e.g., maximum, power level as indicated by large size circles (2122, 2124, 2126), respectively. Device 2108 which uses a second pilot phase represented by the hashed lines pattern is transmitting at an intermediate power level, as indicated by intermediate size circle 2128. The intermediate power level is a lower transmission power level than the transmission power level used by devices 2102, 2104 and 2106. Devices 2110, 2112 and 2114 are using a third pilot phase as represented by the horizontal line pattern. Devices (2110, 2112, 2114) are transmitting at a low, e.g., minimal, power level as indicated by small size circles (2130, 2132 and 2134), respectively. The low power level is lower than the intermediate power level. In some embodiments, the high power level is at least 3 dBs higher than the intermediate power level, and the intermediate power level is at least 3 dBs higher than the low power level. In various embodiments, the high, intermediate, and low power levels represent average transmission power levels.

Figure 22:
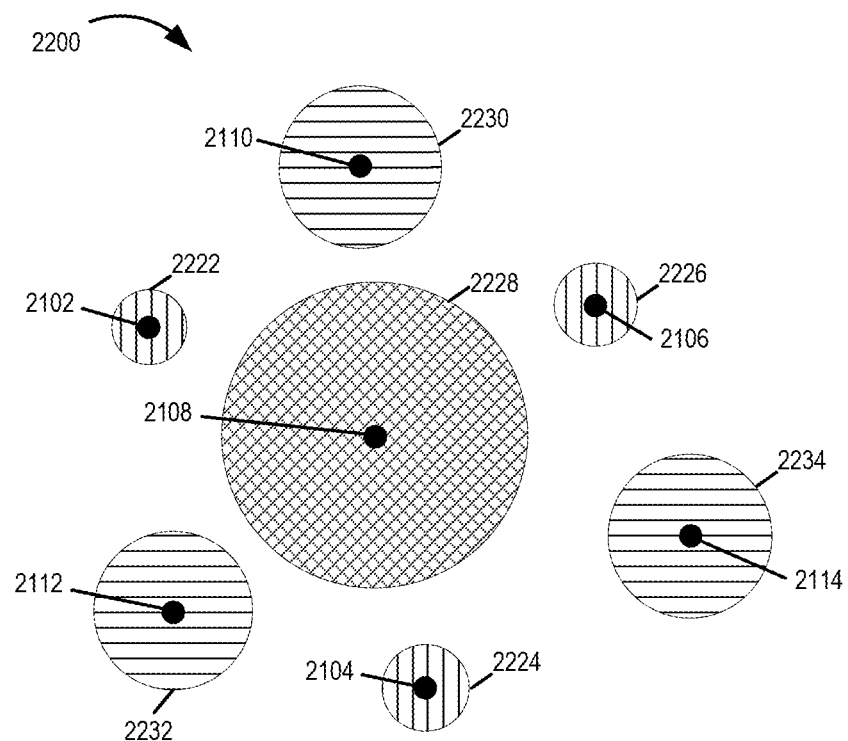
FIG. 22 illustrates an example where different devices of FIG. 21 sharing the same set of transmission resources during a second time are using different transmission power levels for transmitting, based on their pilot phases.

FIG. 22 includes a drawing 2200 illustrating an example with three pilot phases being used by devices. The devices (2102, 2104, 2106, 2108, 2110, 2112, 2114) in the example are represented by small solid dots, and are the same devices as shown in FIG. 21. Each device (2102, 2104, 2106, 2108, 2110, 2112, 2114) is surrounded by a corresponding circle (2222, 2224, 2226, 2228, 2230, 2232, 2234), respectively, where the size of a circle is used to represent a transmission power level. Different pilot phases are shown using different patterns used to fill the circles, e.g., vertical lines pattern, horizontal lines pattern and the hashed lines pattern. In this example, during a second time, which is different from the first time of FIG. 21, devices 2102, 2104 and 2106 use a first pilot phase which is represented by the vertical lines pattern, and the devices (2102, 2104, 2106) are transmitting at a low power level as indicated by small size circles (2222, 2224, 2226), respectively. Device 2108 which uses a second pilot phase represented by the hashed lines pattern is transmitting at a high, e.g., maximum, power level, as indicated by large size circle 2228. Devices 2110, 2112 and 2114 are using a third pilot phase as represented by the horizontal line pattern. Devices (2110, 2112, 2114) are transmitting at a intermediate power level as indicated by intermediate size circles (2230, 2232 and 2234), respectively.

FIG. 21 may correspond to a time during a first peer discovery time interval in a peer to peer recurring time structure, while FIG. 22 may correspond to a time during a second peer discovery time interval in the peer to peer recurring timing structure.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, selection and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between communications devices. In some embodiments one or more communications devices are implemented as access points which establish communications links with mobile nodes using OFDM and/or CDMA and/or may provide connectivity to the internet or another network via a wired or wireless communications link. In various embodiments the mobile nodes are implemented as notebook computers, personal data assistants (PDAs), or other portable devices including receiver/transmitter circuits and logic and/or routines, for implementing the methods.

What is claimed is:

1. A method of operating a wireless communications device to communicate information, comprising:
    transmitting data, during a constant transmission power mode of operation, at a constant transmission power level; and
    transmitting data, during a time varying transmission power mode of operation, using a power level that varies as a function of time according to a predetermined repeating time varying transmission power level pattern wherein transmitting data, during the time varying transmission power mode of operation, includes transmitting the same peer discovery information multiple times, at different power levels, during different peer discovery transmission time periods.

2. The method of claim 1, further comprising:
    switching between said constant transmission power mode of operation and said time varying transmission power mode of operation as a function of a determined amount of network congestion.

3. The method of claim 1, wherein said predetermined repeating time varying transmission power level pattern corresponds to a predetermined recurring transmission schedule of peer discovery intervals, a pilot and data being transmitted during each of said peer discovery intervals.

4. The method of claim 3, further comprising:
    randomly selecting one of a plurality of different transmission power level patterns to control the transmission power level as a function of time during said time varying transmission power mode of operation.

5. The method of claim 3, further comprising:
    selecting one of a plurality of different transmission power level patterns to control the transmission power level as a function of time during said time varying transmission power mode of operation based on which of a plurality of pilot sequences are used by devices in the vicinity of said wireless communications device.

6. The method of claim 1, further comprising:
    transmitting pilots at a first power level during said constant transmission power mode of operation; and
    transmitting pilots at said first power level during said time varying transmission power mode of operation, said constant power level being said first power level.

7. The method of claim 6, wherein said pilots are transmitted using a different pilot sequence than is used by a neighboring communications device using the same pilot transmission resources as said wireless communications device.

8. The method of claim 1, wherein said wireless communications device is a mobile peer to peer communications device.

9. The method of claim 1, wherein said predetermined repeating time varying transmission power level pattern indicates different power levels that are to be used in a specific order.

10. The method of claim 9, wherein said repeating predetermined time varying transmission level pattern includes a first transmission power level, a second transmission power level higher than said first transmission power level and immediately following said first transmission power level and a third transmission power level lower than said second transmission power level and immediately following said second transmission power level in said time varying transmission power level pattern.

11. A wireless communications device comprising:
means for transmitting data, during a constant transmission power mode of operation, at a constant transmission power level; and
means for transmitting data, during a time varying transmission power mode of operation, using a power level that varies as a function of time according to a predetermined repeating time varying transmission power level pattern wherein said means for transmitting during the time varying transmission power mode of operation transmits the same peer discovery information multiple times, at different power levels, during different peer discovery transmission time periods.

12. The communications device of claim 11, further comprising:
means for switching between said constant transmission power mode of operation and said time varying transmission power mode of operation as a function of a determined amount of network congestion.

13. The communications device of claim 11, wherein said predetermined repeating time varying transmission power level pattern corresponds to a predetermined recurring transmission schedule of peer discovery intervals, a pilot and data being transmitted during each of said peer discovery intervals.

14. The communications device of claim 13, further comprising:
means for randomly selecting one of a plurality of different transmission power level patterns to control the transmission power level as a function of time during said time varying transmission power mode of operation.

15. The communications device of claim 13, further comprising:
means for selecting one of a plurality of different transmission power level patterns to control the transmission power level as a function of time during said time varying transmission power mode of operation based on which of a plurality of pilot sequences are used by devices in the vicinity of said wireless communications device.

16. The communications device of claim 11, further comprising:
means for transmitting pilots at a first power level during said constant transmission power mode of operation; and
means for transmitting pilots at a constant power level during said time varying transmission power mode of operation, said constant power level being said first power level.

17. The communications device of claim 11, wherein said predetermined repeating time varying transmission power level pattern indicates different power levels that are to be used in a specific order.

18. A computer program product for use in a wireless communications device, the computer program product comprising:
a non-transitory computer readable medium comprising:
code for causing at least one computer to transmit data, during a constant transmission power mode of operation, at a constant transmission power level; and
code for causing the at least one computer to transmit data, during a time varying transmission power mode of operation, using a power level that varies as a function of time according to a predetermined repeating time varying transmission power level pattern wherein transmitting data, during the time varying transmission power mode of operation, includes transmitting the same peer discovery information multiple times, at different power levels, during different peer discovery transmission time periods.

19. The computer program product of claim 18, wherein said predetermined repeating time varying transmission power level pattern indicates different power levels that are to be used in a specific order.

20. A wireless communications device comprising:
at least one processor configured to:
transmit data, during a constant transmission power mode of operation, at a constant transmission power level; and
transmit data, during a time varying transmission power mode of operation, using a power level that varies as a function of time according to a predetermined repeating time varying transmission power level pattern; and
a memory coupled to said at least one processor wherein transmitting data, during the time varying transmission power mode of operation, includes transmitting the same peer discovery information multiple times, at different power levels, during different peer discovery transmission time periods.

21. The communications device of claim 20, wherein said at least one processor is further configured to:
switch between said constant transmission power mode of operation and said time varying transmission power mode of operation as a function of a determined amount of network congestion.

22. The communications device of claim 21, wherein said at least one processor is further configured to:
randomly select one of a plurality of different transmission power level patterns to control the transmission power level as a function of time during said time varying transmission power mode of operation.

23. The communications device of claim 21, wherein said at least one processor is further configured to:
select one of a plurality of different transmission power level patterns to control the transmission power level as a function of time during said time varying transmission power mode of operation based on which of a plurality of pilot sequences are used by devices in the vicinity of said wireless communications device.

24. The wireless communication device of claim 20, wherein said predetermined repeating time varying transmission power level pattern indicates different power levels that are to be used in a specific order.

* * * * *